United States Patent
Xia et al.

(10) Patent No.: US 10,314,024 B2
(45) Date of Patent: Jun. 4, 2019

(54) METHODS FOR TRANSMITTING AND STORING DOWNLINK DATA, BASE STATION, AND TERMINAL

(71) Applicant: Huawei Technologies Co., Ltd., Shenzhen (CN)

(72) Inventors: Jinhuan Xia, Beijing (CN); Brian Classon, Palatine, IL (US); Matthew William Webb, Issy les Moulineaux (FR); Zheng Yu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 89 days.

(21) Appl. No.: 15/413,477

(22) Filed: Jan. 24, 2017

(65) Prior Publication Data
US 2017/0135080 A1 May 11, 2017

Related U.S. Application Data

(63) Continuation of application No. PCT/CN2015/084817, filed on Jul. 22, 2015.

(30) Foreign Application Priority Data

Jul. 25, 2014 (CN) .......................... 2014 1 0360176

(51) Int. Cl.
*H04W 72/04* (2009.01)
*H04L 1/00* (2006.01)
(Continued)

(52) U.S. Cl.
CPC ......... *H04W 72/042* (2013.01); *H04L 1/0057* (2013.01); *H04L 1/0067* (2013.01);
(Continued)

(58) Field of Classification Search
CPC .......................... H04W 72/042; H04W 68/02; H04W 72/005; H04W 8/22; H04L 1/0057;
(Continued)

(56) References Cited

U.S. PATENT DOCUMENTS

2008/0320353 A1* 12/2008 Blankenship ......... H04L 1/0068
714/746
2012/0087396 A1* 4/2012 Nimbalker ............ H04L 1/1822
375/219
(Continued)

FOREIGN PATENT DOCUMENTS

CN 101217352 A 7/2008
CN 103378956 A 10/2013
(Continued)

OTHER PUBLICATIONS

3rd Generation Partnership Project; Technical Specification Group Radio Access Network; Evolved Universal Terrestrial Radio Access (E-UTRA); Multiplexing and channel coding (Release 12); 3GPP TS 36.212, v12.1.0, Jun. 2014, 89 pages.
(Continued)

*Primary Examiner* — Ajay Cattungal
(74) *Attorney, Agent, or Firm* — Slater Matsil, LLP

(57) ABSTRACT

The present invention relates to the field of communications technologies, and discloses methods for transmitting and storing downlink data, a base station, and a terminal. In this solution, each time when a base station transmits downlink data, bits are selected in such a way that a length and a start point of a sequence that a terminal of any terminal category expects to receive in initial transmission (or retransmission) of a code block are the same as a length and a start point of a sequence that a transmit end determines to transmit for the same code block, so that the terminal can perform reliable decoding. Therefore, a disadvantage is avoided that the terminal cannot correctly perform storing and further cannot
(Continued)

---

100 — When determining that downlink data is broadcast data, perform bit selection according to an $N_{cb}$ of a code block of the broadcast data, where the $N_{cb}$ is equal to a $K_w$ of the code block, namely, $N_{cb} = K_w$ 110 — Transmit the broadcast data according to selected bits correctly perform decoding each time when the terminal stores a retransmitted code block for a same code block, and decoding accuracy of the terminal is improved.

14 Claims, 7 Drawing Sheets

(51) Int. Cl.
    *H04L 1/18*         (2006.01)
    *H04W 68/02*      (2009.01)
    *H04W 72/00*      (2009.01)
    *H04W 8/22*       (2009.01)

(52) U.S. Cl.
    CPC .......... *H04L 1/1812* (2013.01); *H04L 1/1822* (2013.01); *H04W 68/02* (2013.01); *H04W 72/005* (2013.01); *H04L 1/1874* (2013.01); *H04W 8/22* (2013.01)

(58) Field of Classification Search
    CPC ... H04L 1/1812; H04L 1/0067; H04L 1/1874; H04L 1/1822
    See application file for complete search history.

(56) References Cited

U.S. PATENT DOCUMENTS

| | | |
|---|---|---|
| 2012/0294269 A1 | 11/2012 | Yamada et al. |
| 2013/0165183 A1* | 6/2013 | Gerstenberger ...... H04L 1/1835 455/561 |
| 2014/0045497 A1 | 2/2014 | Abe et al. |
| 2014/0321369 A1* | 10/2014 | Davydov ................ H04W 4/70 370/329 |
| 2015/0296503 A1* | 10/2015 | Larsson .............. H04W 72/048 370/329 |
| 2016/0056926 A1 | 2/2016 | Li et al. |
| 2016/0173262 A1* | 6/2016 | Davydov .............. H04W 76/14 370/329 |
| 2016/0269213 A1* | 9/2016 | Larsson ................ H04L 1/1845 |
| 2016/0270055 A1* | 9/2016 | Larsson ................ H04L 1/0003 |
| 2017/0134209 A1* | 5/2017 | Larsson ................ H04L 1/1845 |

FOREIGN PATENT DOCUMENTS

| | | |
|---|---|---|
| CN | 103503495 A | 1/2014 |
| CN | 103609052 A | 2/2014 |
| EP | 2663011 A1 | 11/2013 |

OTHER PUBLICATIONS

Samsung, "Remaining Issues for New UE Category," 3GPP TSG RAN WG1 #77, R1-142088, Seoul, Korea, May 19-23, 2014, 4 pages.

3rd Generation Partnership Project; Technical Specification Group Radio Access Network; Evolved Universal Terrestrial Radio Access (E-UTRA); Physical layer procedures (Release 12); 3GPP TS 36.213 V12.2.0, Jun. 2014, 207 pages.

* cited by examiner

Calculate, according to an $N_{cb}$ of a code block of downlink data to be stored, an $n_{sb}$ to be stored and of the code block, where the $n_{sb}$ is equal to the $N_{cb}$, namely, $n_{sb} = N_{cb}$, or the $n_{sb}$ is equal to the $N_{cb}$ and equal to a $K_w$ of the code block, namely, $n_{sb} = N_{cb} = K_w$, or the $N_{cb}$ is calculated by using $N_{cb} = \min\left(\left\lfloor \dfrac{N_{IR}}{C} \right\rfloor, K_w \right)$, where $N_{IR} = \left\lfloor M \times \dfrac{N_{soft}}{K_C \cdot K_{MIMO} \cdot \min(M_{DL\_HARQ}, M_{limit})} \right\rfloor$, $K_C = 1$, $K_{MIMO} = 1$, $C = 1$, the $M_{DL\_HARQ}$ is the maximum number of downlink HARQ processes, $M_{limit} = 8$, the $M$ is a preset value or a value notified by using higher layer signaling, and the $N_{soft}$ is the total number of soft channel bits of a terminal of a specified terminal category ⟶ 500

Store, according to the $n_{sb}$ obtained by calculation, soft channel bits of received downlink data ⟶ 510

FIG. 5

When determining that downlink data to be stored is broadcast data, calculate, according to an $N_{soft}$, an $n_{sb}$ that is to be stored and of a code block of the downlink data to be stored ⟶ 600

Store, according to the $n_{sb}$ obtained by calculation, soft channel bits of the downlink data to be stored ⟶ 610

METHODS FOR TRANSMITTING AND STORING DOWNLINK DATA, BASE STATION, AND TERMINAL

CROSS-REFERENCE TO RELATED APPLICATIONS

This application is a continuation of International Application No. PCT/CN2015/084817, filed on Jul. 22, 2015, which claims priority to Chinese Patent Application No. 201410360176.8, filed on Jul. 25, 2014. The disclosures of the aforementioned applications are hereby incorporated by reference in their entireties.

TECHNICAL FIELD

The present invention relates to the field of communications technologies, and in particular, to methods for transmitting and storing downlink data, a base station, and a terminal.

BACKGROUND

LTE (Long Term Evolution) and LTE-A (Long Term Evolution-Advanced) standards define terminal (User Equipment) categories, such as a terminal category 1, a terminal category 2, . . . , and a terminal category 10. Different terminal categories correspond to different uplink capabilities and different downlink capabilities.

For example, a downlink capability of the terminal category 1 includes the maximum number of downlink shared channel DL-SCH transport block bits received within a TTI (Transmission Time Interval) is 10296 bits; the maximum number of bits of a downlink shared channel DL-SCH transport block received within a TTI is 10296 bits; the total number $N_{soft}$ of soft channel bits is 250368 bits; and the maximum number of supported layers for spatial multiplexing in downlink is 1 layer.

An uplink capability of the terminal category 1 includes the maximum number of uplink shared channel UL-SCH transport block bits transmitted within a transmission time interval TI is 5160 bits; the maximum number of bits of an uplink shared channel UL-SCH transport block transmitted within a TTI is 5160 bits; and support for 64QAM in uplink is no.

The total number $N_{soft}$ of soft channel bits in the downlink capability of the terminal category represents a capability of processing a HARQ (Hybrid Automatic Repeat Request) by a terminal, and determines that the terminal has a buffer that can store $N_{soft}$ bits. The number of soft channel bits that can be occupied by each parallel downlink HARQ process is a part of the $N_{soft}$, and a corresponding buffer is used to temporarily store soft channel bits corresponding to the HARQ process.

In an actual application, a transport block first undergoes channel coding before being transmitted. If a transport block is too long (the number of information bits input by coding exceeds 6144), the transport block is divided into multiple code blocks, where each code block includes redundant bits in addition to information bits after undergoing channel coding at a ⅓ bit rate. When a terminal receives a transport block that is transmitted for the first time, the terminal attempts to decode received data. If the data of the transport block is decoded successfully, the successfully decoded data is submitted to a higher layer for further processing; if the data of the transport block fails to be decoded, the terminal replaces data stored in a buffer corresponding to a HARQ process with the data that the terminal is attempting to decode. When the terminal receives a transport block that is retransmitted, retransmitted data of the transport block is combined with the data of the transport block currently in the buffer corresponding to the HARQ process, and the terminal attempts to decode combined data. If the data of the transport block is decoded successfully, the successfully decoded data is submitted to the higher layer for further processing; if the data of the transport block fails to be decoded, the terminal replaces the data that the terminal is attempting to decode, with the data stored in the buffer corresponding to the HARQ process.

A transport block first undergoes channel coding before being transmitted. If a transport block is too long, the transport block is divided into multiple code blocks, where the number of corresponding code words is C, that is, a transport block is divided into C code blocks. Then, a soft buffer size corresponding to each code block is $N_{cb}=N_{IR}/C$. Because for a same transport block, a redundancy version used for data retransmission is different from that used for last transmission of the transport block, bit selection needs to be performed during rate matching that is performed before each code block is transmitted, and then selected bits are used to transmit the code block.

Currently, during transmission of a downlink transport block, when each code block included in the downlink transport block is transmitted, a formula 1 is used to determine a soft buffer size corresponding to an $r^{th}$ code block:

$$N_{cb} = \min\left(\left\lfloor \frac{N_{IR}}{C} \right\rfloor, K_w\right) \quad \text{(formula 1)}$$

where the $N_{cb}$ is a soft buffer size of a code block;
the $N_{IR}$ is a soft buffer size of a transport block, and is calculated by using a formula 2;
the C is the number of code blocks;
the $K_w$ is a length of a virtual circular buffer of the $r^{th}$ code block; and $$N_{IR} = \left\lfloor \frac{N_{soft}}{K_C \cdot K_{MIMO} \cdot \min(M_{DL\_HARQ}, M_{limit})} \right\rfloor \quad \text{(formula 2)}$$

where the $K_C$ is the maximum number of carriers supported during carrier aggregation; if a terminal category of a terminal is 8, and $N_{soft}$=35982720, then $K_C$=5; if a terminal category of a terminal is 6 or 7, $N_{soft}$=3654144, and a capability of the terminal is that the maximum number of supported layers for spatial multiplexing in downlink is 2, then $K_C$=2; in other cases except the foregoing cases, $K_C$=1. The $K_{MIMO}$ is a parameter related to a configured transmission mode, and represents the number of transport blocks that can be transmitted simultaneously within a TTI; if the terminal is configured to receive data transmitted on a PDSCH (Physical Downlink Shared channel) based on a transmission mode 3, 4, 8, 9, or 10, $K_{MIMO}$=2; in other cases, $K_{MIMO}$=1. The $M_{DL\_HARQ}$ is the maximum number of downlink HARQ processes of a terminal in each serving cell; during downlink reception, the terminal has a HARQ entity for processing several parallel HARQ processes for each serving cell, and each downlink HARQ process corresponds to a HARQ process ID; the maximum number of downlink HARQ processes corresponding to each HARQ entity is 8 in an FDD (Frequency Division Duplex) system; the maximum number of HARQ processes in a TDD (Time Division Duplex) system is related to a UL (Uplink)/DL (Downlink) configuration, for example, when the UL/DL configuration is 0, the maximum number of HARQ processes is 4, when the UL/DL configuration is 1, the maximum number of HARQ processes is 7, when the UL/DL configuration is 2, the maximum number of HARQ processes is 10, when the UL/DL configuration is 3, the maximum number of HARQ processes is 9, when the UL/DL configuration is 4, the maximum number of HARQ processes is 12, when the UL/DL configuration is 5, the maximum number of HARQ processes is 15, and when the UL/DL configuration is 6, the maximum number of HARQ processes is 6; in addition, whether in the FDD or TDD system, the terminal further has an additional dedicated broadcast HARQ process. The $M_{limit}$ is a limit value used when a transmit end determines a buffer size that can be used by each HARQ process of a terminal; for example, when the TDD UL/DL configuration is 0, the maximum number of HARQ processes of the terminal is 4, and therefore, the transmit end calculates the buffer size that can be used by each HARQ process of the terminal according to 4 HARQ processes; when the TDD UL/DL configuration is 5, the maximum number of HARQ processes of the terminal is 15, and therefore, the transmit end calculates the buffer size that can be used by each HARQ process of the terminal according to 8 HARQ processes.

However, when the formula 1 is used to select the $N_{cb}$ corresponding to downlink data, and broadcast data (including an SI (System Information) message, an RAR (Random Access Response) message, and a Paging message) is transmitted, there is a disadvantage that the terminal cannot perform decoding correctly because an information sequence transmitted by a base station and an information sequence that the terminal expects to receive are inconsistent. A reason is as follows.

The $N_{soft}$ of some terminals is 25344, and the $N_{IR}$ obtained by calculation according to the formula 2 is 3168 bits (where $M_{DL\_HARQ}=8$, assuming that $K_C=1$ and $K_{MIMO}=1$ and using the FDD system as an example). For example, when the number of broadcast transport block TB bits is 2216, $K_w=6816$, and C=1. Therefore, when downlink data is data that is delivered over a PCH (Paging Channel) to a physical layer, or is data that is delivered over a DL-SCH (Downlink Shared Channel) associated with an RA (Random Access)-RNTI (Radio Network Temporary Identifier) to a physical layer, or is data that is delivered over a DL-SCH associated with an SI (System Information)-RNTI to a physical layer, the base station may select a parameter $$N_{cb} = \min\left(\left\lfloor\frac{N_{IR}}{C}\right\rfloor, K_w\right) = \left\lfloor\frac{N_{IR}}{C}\right\rfloor = 3168$$

when performing bit selection. For terminals of terminal categories 1 to 10, the base station may select a parameter $$N_{cb} = \min\left(\left\lfloor\frac{N_{IR}}{C}\right\rfloor, K_w\right) = K_w = 6816$$

when performing bit selection. Therefore, no matter which parameter is selected by the base station to perform bit selection and transmit broadcast data, a case in which assumptions of some terminals and the base station are inconsistent may occur. For example, when the base station selects the parameter $N_{cb}=3168$, the terminals of the terminal categories 1 to 10 may receive the broadcast data according to the parameter $N_{cb}=6816$; when the base station selects the parameter $N_{cb}=6816$, a terminal whose $N_{soft}$ is 25344 may receive the broadcast according to the parameter $N_{cb}=3168$. In the case of inconsistent assumptions of the terminal and the base station, information bits that the terminal expects the base station to transmit are not information bits actually transmitted by the base station, and therefore, there is the disadvantage that the terminal cannot perform decoding correctly.

SUMMARY

Embodiments of the present invention provide methods for transmitting and storing downlink data, a base station, and a terminal, which are used to solve the disadvantage that a terminal cannot perform decoding correctly in the prior art.

According to a first aspect, a method for transmitting downlink data is provided and includes, when determining that downlink data is broadcast data, performing bit selection according to a soft buffer size $N_{cb}$ of a code block of the broadcast data, where the $N_{cb}$ is equal to a circular buffer size $K_w$ of the code block, namely, $N_{cb}=K_w$; and transmitting the broadcast data according to selected bits.

With reference to the first aspect, in a first possible implementation manner, the determining that downlink data is broadcast data specifically includes: if the downlink data is data that is delivered over a paging channel PCH to a physical layer, determining that the downlink data is the broadcast data; and/or if the downlink data is data that is delivered over a downlink shared channel DL-SCH associated with a random access RA-radio network temporary identifier RNTI to the physical layer, determining that the downlink data is the broadcast data; and/or if the downlink data is data that is delivered over a DL-SCH associated with a system information SI-RNTI to the physical layer, determining that the downlink data is the broadcast data.

With reference to the first aspect, in a second possible implementation manner, the method further includes: when determining that the downlink data is unicast data and that a category of a terminal for receiving the unicast data is a specified terminal category, performing bit selection according to the total number $N_{soft}$ of soft channel bits of the terminal of the specified terminal category; and transmitting the unicast data to the terminal of the specified terminal category according to selected bits.

With reference to the second possible implementation manner of the first aspect, in a third possible implementation manner, the determining that the downlink data is unicast data specifically includes: if the downlink data is data that is delivered over a DL-SCH neither associated with an RA-RNTI nor associated with an SI-RNTI to a physical layer, determining that the downlink data is the unicast data.

With reference to the first or third possible implementation manner of the first aspect, in a fourth possible implementation manner, for the DL-SCH associated with the RA-RNTI, a physical downlink shared channel PDSCH to which the DL-SCH is mapped is indicated by a physical downlink control channel PDCCH including a cyclic redundancy check CRC scrambled by the RA-RNTI; for the DL-SCH associated with the SI-RNTI, a PDSCH to which the DL-SCH is mapped is indicated by a PDCCH including a CRC scrambled by the SI-RNTI; for the DL-SCH not associated with the RA-RNTI, a PDSCH to which the DL-SCH is mapped is indicated by a PDCCH including a CRC that is not scrambled by the RA-RNTI; and for the DL-SCH not associated with the SI-RNTI, a PDSCH to which the DL-SCH is mapped is indicated by a PDCCH including a CRC that is not scrambled by the SI-RNTI.

With reference to any one of the second to the fourth possible implementation manners of the first aspect, in a fifth possible implementation manner, the specified terminal category is acquired according to indication information reported by the terminal, where the indication information is ue-Category-v12xx information, and the v12xx is a version number of a technical specification including the indication information.

With reference to any one of the second to the fourth possible implementation manners of the first aspect, in a sixth possible implementation manner, the terminal of the specified terminal category is a terminal that has a specified uplink capability and/or a specified downlink capability.

With reference to the sixth possible implementation manner of the first aspect, in a seventh possible implementation manner, the specified uplink capability includes one or any combination of the following: the maximum number of uplink shared channel UL-SCH transport block bits transmitted within a transmission time interval TI is 1000; the maximum number of bits of an UL-SCH transport block transmitted within a TI is 1000; and support for 64 quadrature amplitude modulation QAM in uplink is no. The specified downlink capability includes one or any combination of the following: the maximum number of downlink shared channel DL-SCH transport block bits received within a TI is 1000; the maximum number of bits of a DL-SCH transport block received within a TI is 1000; the $N_{soft}$ is 25344; and the maximum number of supported layers for spatial multiplexing in downlink is 1.

According to a second aspect, a method for transmitting downlink data is provided and includes performing bit selection according to a soft buffer size $N_{cb}$ of a code block of downlink data, where the $N_{cb}$ is equal to a circular buffer size $K_w$ of the code block, namely, $N_{cb}=K_w$, or the $N_{cb}$ is calculated by using $$N_{cb} = \min\left(\left\lfloor \frac{N_{IR}}{C} \right\rfloor, K_w\right),$$

where $$N_{IR} = \left\lfloor M \times \frac{N_{soft}}{K_C \cdot K_{MIMO} \cdot \min(M_{DL\_HARQ}, M_{limit})} \right\rfloor,$$

$$K_C = 1,$$

$$K_{MIMO} = 1,$$

$$C = 1,$$

the $M_{DL\_HARQ}$ is the maximum number of downlink hybrid automatic repeat request HARQ processes, $M_{limit}=8$, the M is a preset value or a value notified by using higher layer signaling, and the $N_{soft}$ is the total number of soft channel bits of a terminal of a specified terminal category; and transmitting the downlink data according to selected bits.

With reference to the second aspect, in a first possible implementation manner, the downlink data is data that is delivered over a paging channel PCH to a physical layer; and/or the downlink data is data that is delivered over a downlink shared channel DL-SCH to the physical layer.

With reference to the second aspect or the first possible implementation manner of the second aspect, in a second possible implementation manner, if the downlink data is unicast data, and a category of a terminal for receiving the unicast data is the specified terminal category, and $K_{MIMO}=1$, the transmitting the downlink data according to selected bits includes: transmitting the unicast data to the terminal of the specified terminal category according to the selected bits.

With reference to the second possible implementation manner of the second aspect, in a third possible implementation manner, the unicast data is data that is delivered over a downlink shared channel DL-SCH neither associated with a random access RA-radio network temporary identifier RNTI nor associated with a system information SI-RNTI to the physical layer.

With reference to the third possible implementation manner of the second aspect, in a fourth possible implementation manner, for the DL-SCH not associated with the RA-RNTI, a physical downlink shared channel PDSCH to which the DL-SCH is mapped is indicated by a physical downlink control channel PDCCH including a cyclic redundancy check CRC that is not scrambled by the RA-RNTI; and for the DL-SCH not associated with the SI-RNTI, a PDSCH to which the DL-SCH is mapped is indicated by a PDCCH including a CRC that is not scrambled by the SI-RNTI.

With reference to the second aspect or any one of the first to the fourth possible implementation manners of the second aspect, in a fifth possible implementation manner, the terminal of the specified terminal category is a terminal that has a specified uplink capability and/or a specified downlink capability.

With reference to the fifth possible implementation manner of the second aspect, in a sixth possible implementation manner, the specified uplink capability includes one or any combination of the following: the maximum number of uplink shared channel UL-SCH transport block bits transmitted within a transmission time interval TI is 1000; the maximum number of bits of an UL-SCH transport block transmitted within a TI is 1000; and support for 64 quadrature amplitude modulation QAM in uplink is no. The specified downlink capability includes one or any combination of the following: the maximum number of downlink shared channel DL-SCH transport block bits received within a TI is 1000; the maximum number of bits of a DL-SCH transport block received within a TI is 1000; the total number $N_{soft}$ of soft channel bits is 25344; and the maximum number of supported layers for spatial multiplexing in downlink is 1.

According to a third aspect, a method for transmitting downlink data is provided and includes, when determining that downlink data is broadcast data, performing bit selection according to the total number $N_{soft}$ of soft channel bits; and transmitting the broadcast data according to selected bits.

With reference to the third aspect, in a first possible implementation manner, the determining that downlink data is broadcast data includes: if the downlink data is data that is delivered over a paging channel PCH to a physical layer, determining that the downlink data is the broadcast data; and/or if the downlink data is data that is delivered over a downlink shared channel DL-SCH associated with a random access RA-radio network temporary identifier RNTI to the physical layer, determining that the downlink data is the broadcast data; and/or if the downlink data is data that is delivered over a DL-SCH associated with a system information SI-RNTI to the physical layer, determining that the downlink data is the broadcast data.

With reference to the third aspect or the first possible implementation manner of the third aspect, in a second possible implementation manner, the $N_{soft}$ is a first $N_{soft}$, where the first $N_{soft}$ is an $N_{soft}$ of a terminal of a first terminal category, and the first terminal category is any one of a terminal category 1 to a terminal category 5; and the performing bit selection according to the total number $N_{soft}$ of soft channel bits specifically includes performing bit selection according to the first $N_{soft}$.

With reference to the second possible implementation manner of the third aspect, in a third possible implementation manner, the first terminal category is acquired according to first indication information reported by a terminal of a specified terminal category, where the first indication information is ue-Category information; or the first terminal category is determined according to a preset rule.

With reference to the second or third possible implementation manner of the third aspect, in a fourth possible implementation manner, the method further includes: when determining that the downlink data is unicast data and that a category of a terminal for receiving the unicast data is a second terminal category, performing bit selection according to a second $N_{soft}$, where the second $N_{soft}$ is an $N_{soft}$ of the terminal of the second terminal category, and the second terminal category is the specified terminal category; and transmitting the unicast data to the terminal of the specified terminal category according to selected bits.

With reference to the third or fourth possible implementation manner of the third aspect, in a fifth possible implementation manner, the specified terminal category is acquired according to second indication information reported by the terminal of the specified terminal category, where the second indication information is ue-Category-v12xx information, and the v12xx is a version number of a technical specification including the indication information.

With reference to the third aspect or the first possible implementation manner of the third aspect, in a sixth possible implementation manner, the $N_{soft}$ is a second $N_{soft}$, where the second $N_{soft}$ is an $N_{soft}$ of a terminal of a second terminal category, and the second terminal category is a specified terminal category; and the performing bit selection according to the total number $N_{soft}$ of soft channel bits specifically includes: performing bit selection according to the second $N_{soft}$ and the maximum number $M_{DL-HARQ}$ of downlink hybrid automatic repeat request HARQ processes, where the $M_{DL-HARQ}$ is a preset value of 1 or 2 or 3.

With reference to the sixth possible implementation manner of the third aspect, in a seventh possible implementation manner, the specified terminal category is acquired according to second indication information reported by the terminal of the specified terminal category, where the second indication information is ue-Category-v12xx information, and the v12xx is a version number of a technical specification including the indication information.

With reference to the sixth or seventh possible implementation manner of the third aspect, in an eighth possible implementation manner, the method further includes when determining that the downlink data is unicast data and that a category of a terminal for receiving the unicast data is the second terminal category, performing bit selection according to the second $N_{soft}$; and transmitting the unicast data to the terminal of the second terminal category according to the selected bits.

With reference to the fourth or eighth possible implementation manner of the third aspect, in a ninth possible implementation manner, the determining that the downlink data is unicast data specifically includes: if the downlink data is data that is delivered over a DL-SCH neither associated with an RA-RNTI nor associated with an SI-RNTI to the physical layer, determining that the downlink data is the unicast data.

With reference to the first or ninth possible implementation manner of the third aspect, in a tenth possible implementation manner, for the DL-SCH associated with the RA-RNTI, a physical downlink shared channel PDSCH to which the DL-SCH is mapped is indicated by a physical downlink control channel PDCCH including a cyclic redundancy check CRC scrambled by the RA-RNTI; for the DL-SCH associated with the SI-RNTI, a PDSCH to which the DL-SCH is mapped is indicated by a PDCCH including a CRC scrambled by the SI-RNTI; for the DL-SCH not associated with the RA-RNTI, a PDSCH to which the DL-SCH is mapped is indicated by a PDCCH including a CRC that is not scrambled by the RA-RNTI; and for the DL-SCH not associated with the SI-RNTI, a PDSCH to which the DL-SCH is mapped is indicated by a PDCCH including a CRC that is not scrambled by the SI-RNTI.

With reference to the third or tenth possible implementation manner of the third aspect, in an eleventh possible implementation manner, the terminal of the specified terminal category is a terminal that has a specified uplink capability and/or a specified downlink capability.

With reference to the eleventh possible implementation manner of the third aspect, in a twelfth possible implementation manner, the specified uplink capability includes one or any combination of the following: the maximum number of uplink shared channel UL-SCH transport block bits transmitted within a transmission time interval TTI is 1000; the maximum number of bits of an UL-SCH transport block transmitted within a TTI is 1000; and support for 64 quadrature amplitude modulation QAM in uplink is no. The specified downlink capability includes one or any combination of the following: the maximum number of downlink shared channel DL-SCH transport block bits received within a TTI is 1000; the maximum number of bits of a DL-SCH transport block received within a TTI is 1000; the $N_{soft}$ is 25344; and the maximum number of supported layers for spatial multiplexing in downlink is 1.

According to a fourth aspect, a method for storing downlink data is provided and includes: when determining that downlink data to be stored is broadcast data, calculating, according to a circular buffer size $K_w$ of a code block of the downlink data to be stored, the number $n_{sb}$ of soft channel bits that are to be stored and of the code block, where the $n_{sb}$ is equal to the $K_w$, namely, $n_{sb}=K_w$; and storing, according to the $n_{sb}$ obtained by calculation, soft channel bits of the downlink data to be stored.

With reference to the fourth aspect, in a first possible implementation manner, before the calculating, according to a circular buffer size $K_w$ of a code block of the downlink data to be stored, the number $n_{sb}$ of soft channel bits that are to be stored and of the code block, the method further includes: performing rate de-matching on received downlink data according to a soft buffer size $N_{cb}$ of a code block of the received downlink data, where the received downlink data includes the downlink data to be stored and downlink data that is not stored, and the $N_{cb}$ is equal to the circular buffer size $K_w$ of the code block, namely, $N_{cb}=K_w$.

With reference to the fourth aspect or the first possible implementation manner of the fourth aspect, in a second possible implementation manner, the determining that downlink data to be stored is broadcast data specifically includes: if the downlink data to be stored is data that is delivered over a downlink shared channel DL-SCH associated with a system information SI-radio network temporary identifier RNTI to a physical layer, determining that the downlink data to be stored is the broadcast data, where the received downlink data is data delivered over a paging channel PCH to the physical layer, and/or is data delivered over a DL-SCH associated with a random access RA-RNTI to the physical layer, and/or is the data delivered over the DL-SCH associated with the SI-RNTI to the physical layer.

With reference to the fourth aspect or the first and second possible implementation manners of the fourth aspect, in a third possible implementation manner, the method further includes: when determining that the downlink data to be stored is unicast data and that a terminal for storing the downlink data to be stored is a terminal of a specified terminal category, calculating the $n_{sb}$ according to the total number $N_{soft}$ of soft channel bits of the terminal of the specified terminal category; and storing, according to the $n_{sb}$ obtained by calculation, the soft channel bits of the downlink data to be stored.

With reference to the third possible implementation manner of the fourth aspect, in a fourth possible implementation manner, before the calculating the $n_{sb}$ according to the total number $N_{soft}$ of soft channel bits of the terminal of the specified terminal category, the method further includes: performing rate de-matching on the received downlink data according to the $N_{soft}$ of the terminal of the specified terminal category, where the received downlink data includes the downlink data to be stored and the downlink data that is not stored.

With reference to the third or fourth possible implementation manner of the fourth aspect, in a fifth possible implementation manner, the determining that the downlink data to be stored is unicast data specifically includes: if the downlink data to be stored is data that is delivered over a DL-SCH not associated with an SI-RNTI to the physical layer, determining that the downlink data to be stored is the unicast data, where the received downlink data is data delivered over a DL-SCH neither associated with the RA-RNTI nor associated with the SI-RNTI to the physical layer.

With reference to the second or fifth possible implementation manner of the fourth aspect, in a sixth possible implementation manner, for the DL-SCH associated with the SI-RNTI, a physical downlink shared channel PDSCH to which the DL-SCH is mapped is indicated by a physical downlink control channel PDCCH including a cyclic redundancy check CRC scrambled by the SI-RNTI; for the DL-SCH associated with the RA-RNTI, a PDSCH to which the DL-SCH is mapped is indicated by a PDCCH including a CRC scrambled by the RA-RNTI; for the DL-SCH not associated with the SI-RNTI, a PDSCH to which the DL-SCH is mapped is indicated by a PDCCH including a CRC that is not scrambled by the SI-RNTI; and for the DL-SCH not associated with the RA-RNTI, a PDSCH to which the DL-SCH is mapped is indicated by a PDCCH including a CRC that is not scrambled by the RA-RNTI.

With reference to the third or sixth possible implementation manner of the fourth aspect, in a seventh possible implementation manner, the terminal of the specified terminal category is a terminal that has a specified uplink capability and/or a specified downlink capability.

With reference to the seventh possible implementation manner of the fourth aspect, in an eighth possible implementation manner, the specified uplink capability includes one or any combination of the following: the maximum number of uplink shared channel UL-SCH transport block bits transmitted within a transmission time interval TTI is 1000; the maximum number of bits of an UL-SCH transport block transmitted within a TI is 1000; and support for 64 quadrature amplitude modulation QAM in uplink is no. The specified downlink capability includes one or any combination of the following: the maximum number of downlink shared channel DL-SCH transport block bits received within a TI is 1000; the maximum number of bits of a DL-SCH transport block received within a TI is 1000; the $N_{soft}$ is 25344; and the maximum number of supported layers for spatial multiplexing in downlink is 1.

According to a fifth aspect, a method for storing downlink data is provided and includes: calculating, according to a soft buffer size $N_{cb}$ of a code block of downlink data to be stored, the number $n_{sb}$ of soft channel bits that are to be stored and of the code block, where the $n_{sb}$ is equal to the $N_{cb}$, namely, $n_{sb}=N_{cb}$, or the $n_{sb}$ is equal to the $N_{cb}$ and equal to a $K_w$ of the code block, namely, $n_{sb}=N_{cb}=K_w$, or the $N_{cb}$ is calculated by using $$N_{cb} = \min\left(\left\lfloor \frac{N_{IR}}{C} \right\rfloor, K_w\right),$$

where $$N_{IR} = \left\lfloor M \times \frac{N_{soft}}{K_C \cdot K_{MIMO} \cdot \min(M_{DL\_HARQ}, M_{limit})} \right\rfloor,$$

$$K_C = 1,$$

$$K_{MIMO} = 1,$$

$$C = 1,$$

the $M_{DL\_HARQ}$ is the maximum number of downlink HARQ processes, $M_{limit}=8$, the M is a preset value or a value notified by using higher layer signaling, and the $N_{soft}$ is the total number of soft channel bits of a terminal of a specified terminal category; and storing, according to the $n_{sb}$ obtained by calculation, soft channel bits of received downlink data.

With reference to the fifth aspect, in a first possible implementation manner, before the calculating, according to an $N_{cb}$ of a code block of downlink data to be stored, the number $n_{sb}$ of soft channel bits that are to be stored and of the code block, the method further includes: performing rate de-matching on the received downlink data according to the $N_{cb}$, where the received downlink data includes the downlink data to be stored and downlink data that is not stored, and the $N_{cb}$ is equal to the $K_w$ of the code block, namely, $N_{cb}=K_w$, or the $N_{cb}$ is calculated by using $$N_{cb} = \min\left(\left\lfloor \frac{N_{IR}}{C} \right\rfloor, K_w\right),$$

where $$N_{IR} = \left\lfloor M \times \frac{N_{soft}}{K_C \cdot K_{MIMO} \cdot \min(M_{DL\_HARQ}, M_{limit})} \right\rfloor,$$

$$K_C = 1,$$

$$K_{MIMO} = 1,$$

$$C = 1,$$

the $M_{DL\_HARQ}$ is the maximum number of downlink HARQ processes, $M_{limit}=8$, the M is the preset value or the value notified by using higher layer signaling, and the $N_{soft}$ is the total number of soft channel bits of the terminal of the specified terminal category.

With reference to the fifth aspect or the first possible implementation manner of the fifth aspect, in a second possible implementation manner, the downlink data to be stored is data that is delivered over a downlink shared channel DL-SCH to a physical layer; and the received downlink data is data that is delivered over a paging channel PCH to the physical layer, and/or is the data that is delivered over the downlink shared channel DL-SCH to the physical layer.

According to a sixth aspect, a method for storing downlink data is provided and includes: when determining that downlink data to be stored is broadcast data, calculating, according to the total number $N_{soft}$ of soft channel bits, the number $n_{sb}$ of soft channel bits that are to be stored and of a code block of the downlink data to be stored; and storing, according to the $n_{sb}$ obtained by calculation, the soft channel bits of the downlink data to be stored.

With reference to the sixth aspect, in a first possible implementation manner, before the calculating, according to the total number $N_{soft}$ of soft channel bits, the number $n_{sb}$ of soft channel bits that are to be stored and of a code block of the downlink data to be stored, the method further includes: performing rate de-matching on received downlink data according to the $N_{soft}$, where the received downlink data includes the downlink data to be stored and downlink data that is not stored.

With reference to the sixth aspect or the first possible implementation manner of the sixth aspect, in a second possible implementation manner, the determining that downlink data to be stored is broadcast data specifically includes: if the downlink data to be stored is data that is delivered over a downlink shared channel DL-SCH associated with a system information SI-radio network temporary identifier RNTI to a physical layer, determining that the downlink data to be stored is the broadcast data, where the received downlink data is data delivered over a paging channel PCH to the physical layer, and/or is data delivered over a DL-SCH associated with a random access RA-RNTI to the physical layer, and/or is the data delivered over the DL-SCH associated with the SI-RNTI to the physical layer.

With reference to the sixth aspect or the first and second possible implementation manners of the sixth aspect, in a third possible implementation manner, the $N_{soft}$ is a first $N_{soft}$, where: the first $N_{soft}$ is an $N_{soft}$ of a terminal of a first terminal category, and the first terminal category is any one of a terminal category 1 to a terminal category 5; the calculating, according to the total number $N_{soft}$ of soft channel bits, the number $n_{sb}$ of soft channel bits that are to be stored and of a code block of the downlink data to be stored, specifically includes: calculating, according to the first $N_{soft}$, the $n_{sb}$ that is to be stored and of the code block of the downlink data to be stored; and the performing rate de-matching on received downlink data according to the $N_{soft}$ specifically includes: performing rate de-matching on the received downlink data according to the first $N_{soft}$.

With reference to the third possible implementation manner of the sixth aspect, in a fourth possible implementation manner, the first terminal category is acquired according to first indication information reported by a terminal of a specified terminal category to a base station, where the first indication information is ue-Category information; or the first terminal category is determined according to a preset rule.

With reference to the third or fourth possible implementation manner of the sixth aspect, in a fifth possible implementation manner, the method further includes: when determining that the downlink data to be stored is unicast data and that a terminal for storing the unicast data is the terminal of the specified terminal category, calculating the $n_{sb}$ according to a second $N_{soft}$, where the second $N_{soft}$ is an $N_{soft}$ of the terminal of the specified terminal category; and storing, according to the $n_{sb}$ obtained by calculation, the soft channel bits of the downlink data to be stored.

With reference to the fifth possible implementation manner of the sixth aspect, in a sixth possible implementation manner, before the calculating the $n_{sb}$ according to a second $N_{soft}$, the method further includes: performing rate de-matching on the received downlink data according to the second $N_{soft}$, where the received downlink data includes the downlink data to be stored and the downlink data that is not stored, the second $N_{soft}$ is an $N_{soft}$ of a terminal of a second terminal category, and the second terminal category is the specified terminal category.

With reference to the sixth aspect or the first and second possible implementation manners of the sixth aspect, in a seventh possible implementation manner, the $N_{soft}$ is a second $N_{soft}$, where the second $N_{soft}$ is an $N_{soft}$ of a terminal of a specified terminal category; the calculating, according to the total number $N_{soft}$ of soft channel bits, the number $n_{sb}$ of soft channel bits that are to be stored and of a code block to be stored, specifically includes: calculating, according to the second $N_{soft}$ and the maximum number $M_{DL-HARQ}$ of downlink hybrid automatic repeat request HARQ processes, the $n_{sb}$ that is to be stored and of the code block to be stored, where the $M_{DL-HARQ}$ is a preset value of 1 or 2 or 3; and the performing rate de-matching on received downlink data according to the $N_{soft}$ specifically includes: performing rate de-matching on the received downlink data according to the second $N_{soft}$ and the maximum number $M_{DL-HARQ}$ of downlink hybrid automatic repeat request HARQ processes, where the $M_{DL-HARQ}$ is the preset value of 1 or 2 or 3.

With reference to the seventh possible implementation manner of the sixth aspect, in an eighth possible implementation manner, the method further includes: when determining that the downlink data to be stored is unicast data and that a terminal for storing the unicast data is the terminal of the specified terminal category, calculating the $n_{sb}$ according to the second $N_{soft}$, where the second $N_{soft}$ is the $N_{soft}$ of the terminal of the specified terminal category; and storing, according to the $n_{sb}$ obtained by calculation, the soft channel bits of the downlink data to be stored.

With reference to the eighth possible implementation manner of the sixth aspect, in a ninth possible implementation manner, before the calculating the $n_{sb}$ according to the second $N_{soft}$, the method further includes: performing rate de-matching on the received downlink data according to the second $N_{soft}$, where the received downlink data includes the downlink data to be stored and the downlink data that is not stored, and the second $N_{soft}$ is the $N_{soft}$ of the terminal of the specified terminal category.

With reference to the fifth or eighth possible implementation manner of the sixth aspect, in a tenth possible implementation manner, the determining that the downlink data to be stored is unicast data specifically includes: if the downlink data to be stored is data that is delivered over a DL-SCH not associated with an SI-RNTI to the physical layer, determining that the downlink data to be stored is the unicast data.

With reference to the sixth possible implementation manner of the sixth aspect, in an eleventh possible implementation manner, the received downlink data is the data delivered over the PCH to the physical layer, and/or is the data delivered over the DL-SCH associated with the RA-RNTI to the physical layer, and/or is the data delivered over the DL-SCH associated with the SI-RNTI to the physical layer.

With reference to the second, tenth, or eleventh possible implementation manner of the sixth aspect, in a twelfth possible implementation manner, for the DL-SCH associated with the SI-RNTI, a physical downlink shared channel PDSCH to which the DL-SCH is mapped is indicated by a physical downlink control channel PDCCH including a cyclic redundancy check CRC scrambled by the SI-RNTI; for the DL-SCH associated with the RA-RNTI, a PDSCH to which the DL-SCH is mapped is indicated by a PDCCH including a CRC scrambled by the RA-RNTI; for the DL-SCH not associated with the SI-RNTI, a PDSCH to which the DL-SCH is mapped is indicated by a PDCCH including a CRC that is not scrambled by the SI-RNTI; and for the DL-SCH not associated with the RA-RNTI, a PDSCH to which the DL-SCH is mapped is indicated by a PDCCH including a CRC that is not scrambled by the RA-RNTI.

With reference to any one of the fourth to the twelfth possible implementation manners of the sixth aspect, in a thirteenth possible implementation manner, the terminal of the specified terminal category is a terminal that has a specified uplink capability and/or a specified downlink capability.

With reference to the thirteenth possible implementation manner of the sixth aspect, in a fourteenth possible implementation manner, the specified uplink capability includes one or any combination of the following: the maximum number of uplink shared channel UL-SCH transport block bits transmitted within a transmission time interval TI is 1000; the maximum number of bits of an UL-SCH transport block transmitted within a TI is 1000; and support for 64 quadrature amplitude modulation QAM in uplink is no. The specified downlink capability includes one or any combination of the following: the maximum number of downlink shared channel DL-SCH transport block bits received within a TI is 1000; the maximum number of bits of a DL-SCH transport block received within a TI is 1000; the $N_{soft}$ is 25344; and the maximum number of supported layers for spatial multiplexing in downlink is 1.

According to a seventh aspect, a base station is provided and includes: a selecting unit, configured to: when determining that downlink data is broadcast data, perform bit selection according to a soft buffer size $N_{cb}$ of a code block of the broadcast data, where the $N_{cb}$ is equal to a circular buffer size $K_w$ of the code block, namely, $N_{cb}=K_w$; and a transmitting unit, configured to transmit the broadcast data according to selected bits.

With reference to the seventh aspect, in a first possible implementation manner, the selecting unit is specifically configured to: if the downlink data is data that is delivered over a paging channel PCH to a physical layer, determine that the downlink data is the broadcast data; and/or if the downlink data is data that is delivered over a downlink shared channel DL-SCH associated with a random access RA-radio network temporary identifier RNTI to the physical layer, determine that the downlink data is the broadcast data; and/or if the downlink data is data that is delivered over a DL-SCH associated with a system information SI-RNTI to the physical layer, determine that the downlink data is the broadcast data.

With reference to the seventh aspect, in a second possible implementation manner, the selecting unit is further configured to: when determining that the downlink data is unicast data and that a category of a terminal for receiving the unicast data is a specified terminal category, perform bit selection according to the total number $N_{soft}$ of soft channel bits of the terminal of the specified terminal category. The transmitting unit is further configured to transmit the unicast data to the terminal of the specified terminal category according to selected bits.

With reference to the second possible implementation manner of the seventh aspect, in a third possible implementation manner, the selecting unit is specifically configured to: if the downlink data is data that is delivered over a DL-SCH neither associated with an RA-RNTI nor associated with an SI-RNTI to a physical layer, determine that the downlink data is the unicast data.

With reference to the first or third possible implementation manner of the seventh aspect, in a fourth possible implementation manner, for the DL-SCH associated with the RA-RNTI, over which the downlink data determined by the selecting unit is delivered to the physical layer, a physical downlink shared channel PDSCH to which the DL-SCH is mapped is indicated by a physical downlink control channel PDCCH including a cyclic redundancy check CRC scrambled by the RA-RNTI; for the DL-SCH associated with the SI-RNTI, over which the downlink data determined by the selecting unit is delivered to the physical layer, a PDSCH to which the DL-SCH is mapped is indicated by a PDCCH including a CRC scrambled by the SI-RNTI; for the DL-SCH not associated with the RA-RNTI, over which the downlink data determined by the selecting unit is delivered to the physical layer, a PDSCH to which the DL-SCH is mapped is indicated by a PDCCH including a CRC that is not scrambled by the RA-RNTI; and for the DL-SCH not associated with the SI-RNTI, over which the downlink data determined by the selecting unit is delivered to the physical layer, a PDSCH to which the DL-SCH is mapped is indicated by a PDCCH including a CRC that is not scrambled by the SI-RNTI.

With reference to any one of the second to the fourth possible implementation manners of the seventh aspect, in a fifth possible implementation manner, the specified terminal category of the terminal for receiving the downlink data transmitted by the transmitting unit is acquired according to indication information reported by the terminal, where the indication information is ue-Category-v12xx information, and the v12xx is a version number of a technical specification including the indication information.

With reference to any one of the second to the fourth possible implementation manners of the seventh aspect, in a sixth possible implementation manner, the terminal of the specified terminal category that receives the downlink data transmitted by the transmitting unit is a terminal that has a specified uplink capability and/or a specified downlink capability.

With reference to the sixth possible implementation manner of the seventh aspect, in a seventh possible implementation manner, the specified uplink capability of the terminal of the specified terminal category that receives the downlink data transmitted by the transmitting unit includes one or any combination of the following: the maximum number of uplink shared channel UL-SCH transport block bits transmitted within a transmission time interval TI is 1000; the maximum number of bits of an UL-SCH transport block transmitted within a TTI is 1000; and support for 64 quadrature amplitude modulation QAM in uplink is no. The specified downlink capability of the terminal of the specified terminal category that receives the downlink data transmitted by the transmitting unit includes one or any combination of the following: the maximum number of downlink shared channel DL-SCH transport block bits received within a TTI is 1000; the maximum number of bits of a DL-SCH transport block received within a TTI is 1000; the $N_{soft}$ is 25344; and the maximum number of supported layers for spatial multiplexing in downlink is 1.

According to an eighth aspect, a base station is provided and includes: a selecting unit, configured to perform bit selection according to a soft buffer size $N_{cb}$ of a code block of downlink data, where the $N_b$ is equal to a circular buffer size $K_w$ of the code block, namely, $N_{cb}=K_w$, or the $N_b$ is calculated by using $$N_{cb} = \min\left(\left\lfloor \frac{N_{IR}}{C} \right\rfloor, K_w\right),$$

where $$N_{IR} = \left\lfloor M \times \frac{N_{soft}}{K_C \cdot K_{MIMO} \cdot \min(M_{DL\_HARQ}, M_{limit})} \right\rfloor,$$

$$K_C = 1,$$

$$K_{MIMO} = 1,$$

$$C = 1,$$

the $M_{DL\_HARQ}$ is the maximum number of downlink hybrid automatic repeat request HARQ processes, $M_{limit}=8$, the M is a preset value or a value notified by using higher layer signaling, and the $N_{soft}$ is the total number of soft channel bits of a terminal of a specified terminal category. A transmitting unit is configured to transmit the downlink data according to selected bits.

With reference to the eighth aspect, in a first possible implementation manner, the downlink data corresponding to the $N_{cb}$ used when the selecting unit performs bit selection is data that is delivered over a paging channel PCH to a physical layer, and/or is data that is delivered over a downlink shared channel DL-SCH to the physical layer.

With reference to the eighth aspect or the first possible implementation manner of the eighth aspect, in a second possible implementation manner, the transmitting unit is further configured to: if the downlink data is unicast data, and a category of a terminal for receiving the unicast data is the specified terminal category, and when $K_{MIMO}=1$, transmit the unicast data to the terminal of the specified terminal category according to the selected bits.

With reference to the second possible implementation manner of the eighth aspect, in a third possible implementation manner, the unicast data transmitted by the transmitting unit is data that is delivered over a downlink shared channel DL-SCH neither associated with a random access RA-radio network temporary identifier RNTI nor associated with a system information SI-RNTI to the physical layer.

With reference to the third possible implementation manner of the eighth aspect, in a fourth possible implementation manner, for the DL-SCH not associated with the RA-RNTI, over which the unicast data transmitted by the transmitting unit is delivered to the physical layer, a physical downlink shared channel PDSCH to which the DL-SCH is mapped is indicated by a physical downlink control channel PDCCH including a cyclic redundancy check CRC that is not scrambled by the RA-RNTI; and for the DL-SCH not associated with the SI-RNTI, over which the unicast data transmitted by the transmitting unit is delivered to the physical layer, a PDSCH to which the DL-SCH is mapped is indicated by a PDCCH including a CRC that is not scrambled by the SI-RNTI.

With reference to any one of the eighth aspect or the first to the fourth possible implementation manners of the eighth aspect, in a fifth possible implementation manner, the terminal of the specified terminal category corresponding to the $N_{soft}$ used by the selecting unit is a terminal that has a specified uplink capability and/or a specified downlink capability.

With reference to the fifth possible implementation manner of the eighth aspect, in a sixth possible implementation manner, the specified uplink capability of the terminal of the specified terminal category corresponding to the $N_{soft}$ used by the selecting unit includes one or any combination of the following: the maximum number of uplink shared channel UL-SCH transport block bits transmitted within a transmission time interval TTI is 1000; the maximum number of bits of an UL-SCH transport block transmitted within a TTI is 1000; and support for 64 quadrature amplitude modulation QAM in uplink is no. The specified downlink capability of the terminal of the specified terminal category corresponding to the $N_{soft}$ used by the selecting unit includes one or any combination of the following: the maximum number of downlink shared channel DL-SCH transport block bits received within a TTI is 1000; the maximum number of bits of a DL-SCH transport block received within a TTI is 1000; the total number $N_{soft}$ of soft channel bits is 25344; and the maximum number of supported layers for spatial multiplexing in downlink is 1.

According to a ninth aspect, a base station is provided and includes: a selecting unit, configured to: when determining that downlink data is broadcast data, perform bit selection according to the total number $N_{soft}$ of soft channel bits; and a transmitting unit, configured to transmit the broadcast data according to selected bits.

With reference to the ninth aspect, in a first possible implementation manner, the selecting unit is specifically configured to: if the downlink data is data that is delivered over a paging channel PCH to a physical layer, determine that the downlink data is the broadcast data; and/or if the downlink data is data that is delivered over a downlink shared channel DL-SCH associated with a random access RA-radio network temporary identifier RNTI to the physical layer, determine that the downlink data is the broadcast data; and/or if the downlink data is data that is delivered over a DL-SCH associated with a system information SI-RNTI to the physical layer, determine that the downlink data is the broadcast data.

With reference to the ninth aspect or the first possible implementation manner of the ninth aspect, in a second possible implementation manner, the $N_{soft}$ used when the selecting unit performs bit selection is a first $N_{soft}$, where the first $N_{soft}$ is an $N_{soft}$ of a terminal of a first terminal category, and the first terminal category is any one of a terminal category 1 to a terminal category 5; and the selecting unit is specifically configured to perform bit selection according to the first $N_{soft}$.

With reference to the second possible implementation manner of the ninth aspect, in a third possible implementation manner, the first terminal category corresponding to the $N_{soft}$ used when the selecting unit performs bit selection is acquired according to first indication information reported by a terminal of a specified terminal category, where the first indication information is ue-Category information; or the first terminal category is determined according to a preset rule.

With reference to the second or third possible implementation manner of the ninth aspect, in a fourth possible implementation manner, the selecting unit is further configured to: when determining that the downlink data is unicast data and that a category of a terminal for receiving the unicast data is a second terminal category, perform bit selection according to a second $N_{soft}$, where the second $N_{soft}$ is an $N_{soft}$ of the terminal of the second terminal category, and the second terminal category is the specified terminal category; and the transmitting unit is further configured to transmit the unicast data to the terminal of the specified terminal category according to selected bits.

With reference to the third or fourth possible implementation manner of the ninth aspect, in a fifth possible implementation manner, the specified terminal category of the terminal that is reported in the first indication information and received by the selecting unit is acquired according to second indication information reported by the terminal of the specified terminal category, where the second indication information is ue-Category-v12xx information, and the v12xx is a version number of a technical specification including the indication information.

With reference to the ninth aspect or the first possible implementation manner of the ninth aspect, in a sixth possible implementation manner, the $N_{soft}$ used when the selecting unit performs bit selection is a second $N_{soft}$, where the second $N_{soft}$ is an $N_{soft}$ of a terminal of a second terminal category, and the second terminal category is a specified terminal category; and the selecting unit is specifically configured to perform bit selection according to the second $N_{soft}$ and the maximum number $M_{DL\text{-}HARQ}$ of downlink hybrid automatic repeat request HARQ processes, where the $M_{DL\text{-}HARQ}$ is a preset value of 1 or 2 or 3.

With reference to the sixth possible implementation manner of the ninth aspect, in a seventh possible implementation manner, the specified terminal category of the terminal that is reported in first indication information and received by the selecting unit is acquired according to second indication information reported by the terminal of the specified terminal category, where the second indication information is ue-Category-v12xx information, and the v12xx is a version number of a technical specification including the indication information.

With reference to the sixth or seventh possible implementation manner of the ninth aspect, in an eighth possible implementation manner, the selecting unit is further configured to: when determining that the downlink data is unicast data and that a category of a terminal for receiving the unicast data is the second terminal category, perform bit selection according to the second $N_{soft}$; and the transmitting unit is further configured to transmit the unicast data to the terminal of the second terminal category according to the selected bits.

With reference to the fourth or eighth possible implementation manner of the ninth aspect, in a ninth possible implementation manner, the selecting unit is specifically configured to: if the downlink data is data that is delivered over a DL-SCH neither associated with an RA-RNTI nor associated with an SI-RNTI to the physical layer, determine that the downlink data is the unicast data.

With reference to the first or ninth possible implementation manner of the ninth aspect, in a tenth possible implementation manner, for the DL-SCH associated with the RA-RNTI, over which the unicast data determined by the selecting unit is delivered to the physical layer, a physical downlink shared channel PDSCH to which the DL-SCH is mapped is indicated by a physical downlink control channel PDCCH including a cyclic redundancy check CRC scrambled by the RA-RNTI; for the DL-SCH associated with the SI-RNTI, over which the unicast data determined by the selecting unit is delivered to the physical layer, a PDSCH to which the DL-SCH is mapped is indicated by a PDCCH including a CRC scrambled by the SI-RNTI; for the DL-SCH not associated with the RA-RNTI, over which the unicast data determined by the selecting unit is delivered to the physical layer, a PDSCH to which the DL-SCH is mapped is indicated by a PDCCH including a CRC that is not scrambled by the RA-RNTI; and for the DL-SCH not associated with the SI-RNTI, over which the unicast data determined by the selecting unit is delivered to the physical layer, a PDSCH to which the DL-SCH is mapped is indicated by a PDCCH including a CRC that is not scrambled by the SI-RNTI.

With reference to the third or tenth possible implementation manner of the ninth aspect, in an eleventh possible implementation manner, the terminal of the specified terminal category that is reported in the first indication information and received by the selecting unit is a terminal that has a specified uplink capability and/or a specified downlink capability.

With reference to the eleventh possible implementation manner of the ninth aspect, in a twelfth possible implementation manner, the specified uplink capability of the terminal reporting the first indication information received by the selecting unit includes one or any combination of the following: the maximum number of uplink shared channel UL-SCH transport block bits transmitted within a transmission time interval TTI is 1000; the maximum number of bits of an UL-SCH transport block transmitted within a TTI is 1000; and support for 64 quadrature amplitude modulation QAM in uplink is no. The specified downlink capability of the terminal reporting the first indication information received by the selecting unit includes one or any combination of the following: the maximum number of downlink shared channel DL-SCH transport block bits received within a TTI is 1000; the maximum number of bits of a DL-SCH transport block received within a TTI is 1000; the $N_{soft}$ is 25344; and the maximum number of supported layers for spatial multiplexing in downlink is 1.

According to a tenth aspect, a terminal is provided and includes: a calculating unit, configured to: when determining that downlink data to be stored is broadcast data, calculate, according to a circular buffer size $K_w$ of a code block of the downlink data to be stored, the number $n_{sb}$ of soft channel bits that are to be stored and of the code block, where the $n_{sb}$ is equal to the $K_w$, namely, $n_{sb}=K_w$; and a storing unit, configured to store, according to the $n_{sb}$ obtained by calculation, soft channel bits of the downlink data to be stored.

With reference to the tenth aspect, in a first possible implementation manner, the terminal further includes a receiving unit, where the receiving unit is configured to: perform rate de-matching on received downlink data according to a soft buffer size $N_{cb}$ of a code block of the received downlink data, where the received downlink data includes the downlink data to be stored and downlink data that is not stored, and the $N_{cb}$ is equal to the circular buffer size $K_w$ of the code block, namely, $N_{cb}=K_w$.

With reference to the tenth aspect or the first possible implementation manner of the tenth aspect, in a second possible implementation manner, the calculating unit is specifically configured to: if the downlink data to be stored is data that is delivered over a downlink shared channel DL-SCH associated with a system information SI-radio network temporary identifier RNTI to a physical layer, determine that the downlink data to be stored is the broadcast data, where the downlink data received by the receiving unit is data delivered over a paging channel PCH to the physical layer, and/or is data delivered over a DL-SCH associated with a random access RA-RNTI to the physical layer, and/or is the data delivered over the DL-SCH associated with the SI-RNTI to the physical layer.

With reference to the tenth aspect or the first and second possible implementation manners of the tenth aspect, in a third possible implementation manner, the calculating unit is further configured to: when determining that the downlink data to be stored is unicast data and that a terminal for storing the downlink data to be stored is a terminal of a specified terminal category, calculate the $n_{sb}$ according to the total number $N_{soft}$ of soft channel bits of the terminal of the specified terminal category; and the storing unit is further configured to store, according to the $n_{sb}$ obtained by calculation, the soft channel bits of the downlink data to be stored.

With reference to the third possible implementation manner of the tenth aspect, in a fourth possible implementation manner, the receiving unit is further configured to: perform rate de-matching on the received downlink data according to the $N_{soft}$ of the terminal of the specified terminal category, where the received downlink data includes the downlink data to be stored and the downlink data that is not stored.

With reference to the second or fourth possible implementation manner of the tenth aspect, in a fifth possible implementation manner, the calculating unit is specifically configured to: if the downlink data to be stored is data that is delivered over a DL-SCH not associated with an SI-RNTI to the physical layer, determine that the downlink data to be stored is the unicast data, where the downlink data received by the receiving unit is data delivered over a DL-SCH neither associated with the RA-RNTI nor associated with the SI-RNTI to the physical layer.

With reference to the second or fifth possible implementation manner of the tenth aspect, in a sixth possible implementation manner, for the DL-SCH associated with the SI-RNTI, over which the downlink data determined by the calculating unit is delivered to the physical layer, a physical downlink shared channel PDSCH to which the DL-SCH is mapped is indicated by a physical downlink control channel PDCCH including a cyclic redundancy check CRC scrambled by the SI-RNTI;

for the DL-SCH associated with the RA-RNTI, over which the downlink data determined by the calculating unit is delivered to the physical layer, a PDSCH to which the DL-SCH is mapped is indicated by a PDCCH including a CRC scrambled by the RA-RNTI;

for the DL-SCH not associated with the SI-RNTI, over which the downlink data determined by the calculating unit is delivered to the physical layer, a PDSCH to which the DL-SCH is mapped is indicated by a PDCCH including a CRC that is not scrambled by the SI-RNTI; and for the DL-SCH not associated with the RA-RNTI, over which the downlink data determined by the calculating unit is delivered to the physical layer, a PDSCH to which the DL-SCH is mapped is indicated by a PDCCH including a CRC that is not scrambled by the RA-RNTI.

With reference to the third or sixth possible implementation manner of the tenth aspect, in a seventh possible implementation manner, the terminal of the specified terminal category corresponding to the $N_{soft}$ used when the calculating unit calculates the $n_{sb}$ is a terminal that has a specified uplink capability and/or a specified downlink capability.

With reference to the seventh possible implementation manner of the tenth aspect, in an eighth possible implementation manner, the specified uplink capability of the terminal of the specified terminal category corresponding to the $N_{soft}$ used when the calculating unit calculates the $n_{sb}$ includes one or any combination of the following:

the maximum number of uplink shared channel UL-SCH transport block bits transmitted within a transmission time interval TI is 1000;

the maximum number of bits of an UL-SCH transport block transmitted within a TTI is 1000; and support for 64 quadrature amplitude modulation QAM in uplink is no; and the specified downlink capability of the terminal of the specified terminal category corresponding to the $N_{soft}$ used when the calculating unit calculates the $n_{sb}$ includes one or any combination of the following:

the maximum number of downlink shared channel DL-SCH transport block bits received within a TI is 1000;

the maximum number of bits of a DL-SCH transport block received within a TTI is 1000;

the $N_{soft}$ is 25344; and the maximum number of supported layers for spatial multiplexing in downlink is 1.

According to an eleventh aspect, a terminal is provided and includes:

a calculating unit, configured to calculate, according to a soft buffer size $N_{cb}$ of a code block of downlink data to be stored, the number $n_{sb}$ of soft channel bits that are to be stored and of the code block, where the $n_{sb}$ is equal to the $N_{cb}$, namely, $n_{sb}=N_{cb}$, or the $n_{sb}$ is equal to the $N_{cb}$ and equal to a $K_w$ of the code block, namely, $n_{sb}=N_{cb}=K_w$, or the $N_{cb}$ is calculated by using $$N_{cb} = \min\left(\left\lfloor \frac{N_{IR}}{C} \right\rfloor, K_w\right),$$

where $$N_{IR} = \left\lfloor M \times \frac{N_{soft}}{K_C \cdot K_{MIMO} \cdot \min(M_{DL\_HARQ}, M_{limit})} \right\rfloor,$$

$$K_C = 1,$$

$$K_{MIMO} = 1,$$

$$C = 1,$$

$M_{DL\_HARQ}$ is the maximum number of downlink HARQ processes, $M_{limit}=8$, the M is a preset value or a value notified by using higher layer signaling, and the $N_{soft}$ is the total number of soft channel bits of a terminal of a specified terminal category; and a storing unit, configured to store, according to the $n_{sb}$ obtained by calculation, soft channel bits of received downlink data.

With reference to the eleventh aspect, in a first possible implementation manner, the terminal further includes a receiving unit, where the receiving unit is configured to:

perform rate de-matching on the received downlink data according to the $N_{cb}$, where the received downlink data includes the downlink data to be stored and downlink data that is not stored, and the $N_{cb}$ is equal to the $K_w$ of the code block, namely, $N_{cb}=K_w$, or the $N_{cb}$ is calculated by using $$N_{cb} = \min\left(\left\lfloor \frac{N_{IR}}{C} \right\rfloor, K_w\right),$$

where $$N_{IR} = \left\lfloor M \times \frac{N_{soft}}{K_C \cdot K_{MIMO} \cdot \min(M_{DL\_HARQ}, M_{limit})} \right\rfloor,$$

$$K_C = 1,$$

$$K_{MIMO} = 1,$$

$$C = 1,$$

the $M_{DL\_HARQ}$ is the maximum number of downlink HARQ processes, $M_{limit}=8$, the M is the preset value or the value notified by using higher layer signaling, and the $N_{soft}$ is the total number of soft channel bits of the terminal of the specified terminal category.

With reference to the eleventh aspect or the first possible implementation manner of the eleventh aspect, in a second possible implementation manner, the downlink data to be stored by the storing unit is data that is delivered over a downlink shared channel DL-SCH to a physical layer; and the downlink data received by the receiving unit is data that is delivered over a paging channel PCH to the physical layer, and/or is the data that is delivered over the downlink shared channel DL-SCH to the physical layer.

According to a twelfth aspect, a terminal is provided and includes:

a calculating unit, configured to: when determining that downlink data to be stored is broadcast data, calculate, according to the total number $N_{soft}$ of soft channel bits, the number $n_{sb}$ of soft channel bits that are to be stored and of a code block of the downlink data to be stored; and a storing unit, configured to store, according to the $n_{sb}$ obtained by calculation, the soft channel bits of the downlink data to be stored.

With reference to the twelfth aspect, in a first possible implementation manner, the terminal further includes a receiving unit, where the receiving unit is configured to:

perform rate de-matching on received downlink data according to the $N_{soft}$, where the received downlink data includes the downlink data to be stored and downlink data that is not stored.

With reference to the twelfth aspect or the first possible implementation manner of the twelfth aspect, in a second possible implementation manner, the calculating unit is specifically configured to:

if the downlink data to be stored is data that is delivered over a downlink shared channel DL-SCH associated with a system information SI-radio network temporary identifier RNTI to a physical layer, determine that the downlink data to be stored is the broadcast data, where the downlink data received by the receiving unit is data delivered over a paging channel PCH to the physical layer, and/or is data delivered over a DL-SCH associated with a random access RA-RNTI to the physical layer, and/or is the data delivered over the DL-SCH associated with the SI-RNTI to the physical layer.

With reference to the twelfth aspect or the first and second possible implementation manners of the twelfth aspect, in a third possible implementation manner, the $N_{soft}$ used when the calculating unit calculates the $n_{sb}$ is a first $N_{soft}$, where:

the first $N_{soft}$ is an $N_{soft}$ of a terminal of a first terminal category, and the first terminal category is any one of a terminal category 1 to a terminal category 5;

the storing unit is specifically configured to calculate, according to the first $N_{soft}$, the $n_{sb}$ that is to be stored and of the code block of the downlink data to be stored; and the receiving unit is specifically configured to perform rate de-matching on the received downlink data according to the first $N_{soft}$.

With reference to the third possible implementation manner of the twelfth aspect, in a fourth possible implementation manner, the first terminal category of the terminal corresponding to the $N_{soft}$ used when the calculating unit calculates the $n_{sb}$ is acquired according to first indication information reported by a terminal of a specified terminal category to a base station, where the first indication information is ue-Category information; or the first terminal category is determined according to a preset rule.

With reference to the third or fourth possible implementation manner of the twelfth aspect, in a fifth possible implementation manner, the calculating unit is further configured to:

when determining that the downlink data to be stored is unicast data and that a terminal for storing the unicast data is the terminal of the specified terminal category, calculate the $n_{sb}$ according to a second $N_{soft}$, where the second $N_{soft}$ is an $N_{soft}$ of the terminal of the specified terminal category; and the storing unit is further configured to store, according to the $n_{sb}$ obtained by calculation, the soft channel bits of the downlink data to be stored.

With reference to the fifth possible implementation manner of the twelfth aspect, in a sixth possible implementation manner, the receiving unit is further configured to:

perform rate de-matching on the received downlink data according to the second $N_{soft}$, where the received downlink data includes the downlink data to be stored and the downlink data that is not stored, the second $N_{soft}$ is an $N_{soft}$ of a terminal of a second terminal category, and the second terminal category is the specified terminal category.

With reference to the twelfth aspect or the first and second possible implementation manners of the twelfth aspect, in a seventh possible implementation manner, the $N_{soft}$ used when the calculating unit calculates the $n_{sb}$ is a second $N_{soft}$, where the second $N_{soft}$ is an $N_{soft}$ of a terminal of a specified terminal category;

the calculating unit is specifically configured to calculate, according to the second $N_{soft}$ and the maximum number $M_{DL\text{-}HARQ}$ of downlink hybrid automatic repeat request HARQ processes, the $n_{sb}$ that is to be stored and of the code block to be stored, where the $M_{DL\text{-}HARQ}$ is a preset value of 1 or 2 or 3; and the receiving unit is specifically configured to perform rate de-matching on the received downlink data according to the second $N_{soft}$ and the maximum number $M_{DL\text{-}HARQ}$ of downlink hybrid automatic repeat request HARQ processes, where the $M_{DL\text{-}HARQ}$ is the preset value of 1 or 2 or 3.

With reference to the seventh possible implementation manner of the twelfth aspect, in an eighth possible implementation manner, the calculating unit is further configured to:

when determining that the downlink data to be stored is unicast data and that a terminal for storing the unicast data is the terminal of the specified terminal category, calculate the $n_{sb}$ according to the second $N_{soft}$, where the second $N_{soft}$ is the $N_{soft}$ of the terminal of the specified terminal category; and the storing unit is further configured to store, according to the $n_{sb}$ obtained by calculation, the soft channel bits of the downlink data to be stored.

With reference to the eighth possible implementation manner of the twelfth aspect, in a ninth possible implementation manner, the receiving unit is further configured to:

perform rate de-matching on the received downlink data according to the second $N_{soft}$, where the received downlink data includes the downlink data to be stored and the downlink data that is not stored, and the second $N_{soft}$ is the $N_{soft}$ of the terminal of the specified terminal category.

With reference to the fifth or eighth possible implementation manner of the twelfth aspect, in a tenth possible implementation manner, the calculating unit is specifically configured to:

if the downlink data to be stored is data that is delivered over a DL-SCH not associated with an SI-RNTI to the physical layer, determine that the downlink data to be stored is the unicast data.

With reference to the sixth possible implementation manner of the twelfth aspect, in an eleventh possible implementation manner, the downlink data received by the receiving unit is the data delivered over the PCH to the physical layer, and/or is the data delivered over the DL-SCH associated with the RA-RNTI to the physical layer, and/or is the data delivered over the DL-SCH associated with the SI-RNTI to the physical layer.

With reference to the second, tenth, or eleventh possible implementation manner of the twelfth aspect, in a twelfth possible implementation manner, for the DL-SCH associated with the SI-RNTI, over which the downlink data received by the receiving unit is delivered to the physical layer, a physical downlink shared channel PDSCH to which the DL-SCH is mapped is indicated by a physical downlink control channel PDCCH including a cyclic redundancy check CRC scrambled by the SI-RNTI;

for the DL-SCH associated with the RA-RNTI, over which the downlink data received by the receiving unit is delivered to the physical layer, a PDSCH to which the DL-SCH is mapped is indicated by a PDCCH including a CRC scrambled by the RA-RNTI;

for the DL-SCH not associated with the SI-RNTI, over which the downlink data determined by the calculating unit is delivered to the physical layer, a PDSCH to which the DL-SCH is mapped is indicated by a PDCCH including a CRC that is not scrambled by the SI-RNTI; and for the DL-SCH not associated with the RA-RNTI, over which the downlink data determined by the calculating unit is delivered to the physical layer, a PDSCH to which the DL-SCH is mapped is indicated by a PDCCH including a CRC that is not scrambled by the RA-RNTI.

With reference to the any one of fourth to twelfth possible implementation manners of the twelfth aspect, in a thirteenth possible implementation manner, the terminal of the specified terminal category that is reported in the first indication information and acquired by the calculating unit is a terminal that has a specified uplink capability and/or a specified downlink capability.

With reference to the thirteenth possible implementation manner of the twelfth aspect, in a fourteenth possible implementation manner, the specified uplink capability of the terminal of the specified terminal category that is reported in the first indication information and acquired by the calculating unit includes one or any combination of the following:

the maximum number of uplink shared channel UL-SCH transport block bits transmitted within a transmission time interval TI is 1000;

the maximum number of bits of an UL-SCH transport block transmitted within a TTI is 1000; and support for 64 quadrature amplitude modulation QAM in uplink is no; and the specified downlink capability of the terminal of the specified terminal category that is reported in the first indication information and acquired by the calculating unit includes one or any combination of the following:

the maximum number of downlink shared channel DL-SCH transport block bits received within a TTI is 1000;

the maximum number of bits of a DL-SCH transport block received within a TTI is 1000;

the $N_{soft}$ is 25344; and the maximum number of supported layers for spatial multiplexing in downlink is 1.

Beneficial effects of the present invention are as follows.

In the embodiments of the present invention, each time when a base station transmits downlink data, bits are selected in such a way that a length and a start point of a sequence that a terminal of any terminal category expects to receive in initial transmission (or retransmission) of a code block are the same as a length and a start point of a sequence transmitted by a transmit end in initial transmission (or retransmission) of the same code block, so that the terminal of any terminal category can perform reliable decoding; if decoding fails, a start point of a sequence stored by the terminal of any terminal category each time in initial transmission (or retransmission) of a same code block is the same as a start point of a sequence transmitted by the transmit end in initial transmission (or retransmission) of the same code block. Therefore, decoding accuracy of the terminal is improved.

BRIEF DESCRIPTION OF THE DRAWINGS

FIG. 5 is a second flowchart of storing downlink data according to an embodiment of the present invention;

FIG. 6 is a third flowchart of storing downlink data according to an embodiment of the present invention;

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following describes in detail exemplary implementation manners of the present invention with reference to the accompanying drawings of the specification. It should be understood that the exemplary embodiments described herein are merely used to describe and explain the present invention, but are not intended to limit the present invention. In addition, in the case of no conflict, the embodiments in the present application and features in the embodiments may be mutually combined.

The following describes in detail the exemplary implementation manners of the present invention with reference to the accompanying drawings.

Embodiment 1

Figure 1:
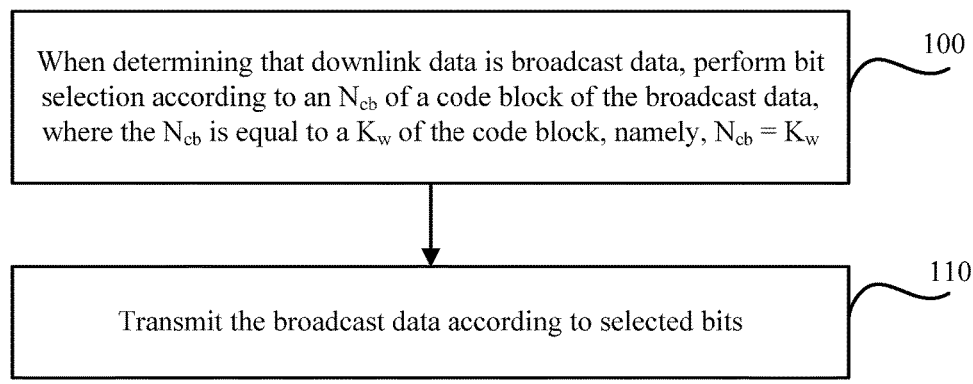
FIG. 1 is a first flowchart of transmitting downlink data according to an embodiment of the present invention.

As shown in FIG. 1, in the embodiment of the present invention, a first detailed process of transmitting downlink data is as follows.

Step 100: When determining that downlink data is broadcast data, perform bit selection according to an $N_{cb}$ of a code block of the broadcast data, where the $N_{cb}$ is equal to a $K_w$ of the code block, namely, $N_{cb}=K_w$.

Step 110: Transmit the broadcast data according to selected bits.

In the embodiment of the present invention, there are multiple manners of determining that the downlink data is the broadcast data. Optionally, the following manners may be used:

if the downlink data is data that is delivered over a PCH to a physical layer, determining that the downlink data is the broadcast data; and/or if the downlink data is data that is delivered over a DL-SCH associated with an RA-RNTI to the physical layer, determining that the downlink data is the broadcast data; and/or if the downlink data is data that is delivered over a DL-SCH associated with an SI-RNTI to the physical layer, determining that the downlink data is the broadcast data.

That is, the downlink data may be a Paging message, or an RA-RNTI message, or an SI-RNTI message.

A category of a terminal for receiving the downlink data includes a specified terminal category and a terminal category 1 to a terminal category 10.

In an actual application, the downlink data may be unicast data or broadcast data. Therefore, in the embodiment of the present invention, further, when it is determined that the downlink data is unicast data and that a category of a terminal for receiving the unicast data is a specified terminal category, bit selection is performed according to an $N_{soft}$ of the terminal of the specified terminal category; and the unicast data is transmitted to the terminal of the specified terminal category according to selected bits.

In the embodiment of the present invention, there are multiple manners of determining that the downlink data is the unicast data. Optionally, the following manner may be used: if the downlink data is data that is delivered over a DL-SCH neither associated with an RA-RNTI nor associated with an SI-RNTI to a physical layer, determining that the downlink data is the unicast data.

In the embodiment of the present invention, optionally, for the DL-SCH associated with the RA-RNTI, a PDSCH (Physical Downlink Shared channel) to which the DL-SCH is mapped is indicated by a PDCCH (Physical Downlink Control Channel) including a CRC (Cyclic Redundancy Check) scrambled by the RA-RNTI;

for the DL-SCH associated with the SI-RNTI, a PDSCH to which the DL-SCH is mapped is indicated by a PDCCH including a CRC scrambled by the SI-RNTI;

for the DL-SCH not associated with the RA-RNTI, a PDSCH to which the DL-SCH is mapped is indicated by a PDCCH including a CRC that is not scrambled by the RA-RNTI; and for the DL-SCH not associated with the SI-RNTI, a PDSCH to which the DL-SCH is mapped is indicated by a PDCCH including a CRC that is not scrambled by the SI-RNTI.

In the embodiment of the present invention, when it is determined that the downlink data is the unicast data and that the category of the terminal for receiving the unicast data is the specified terminal category, and when bit selection is performed, bit selection is performed according to the total number $N_{soft}$ of soft channel bits of the terminal of the specified terminal category. In this case, the specified terminal category is acquired according to indication information reported by the terminal, where the indication information is ue-Category-v12xx information, and the v12xx is a version number of a technical specification including the indication information.

In the embodiment of the present invention, the terminal of the specified terminal category has multiple forms, and optionally, may be a terminal that has a specified uplink capability and/or a specified downlink capability.

Optionally, the specified uplink capability and specified downlink capability in the foregoing process may be in the following forms:

the maximum number of UL-SCH (Uplink Shared Channel) transport block bits transmitted within a TTI is 1000;

the maximum number of bits of an UL-SCH transport block transmitted within a TTI is 1000; and support for 64 QAM (Quadrature Amplitude Modulation) in uplink is no; and the specified downlink capability includes one or any combination of the following:

the maximum number of DL-SCH (Downlink Shared Channel) transport block bits received within a TI is 1000;

the maximum number of bits of a DL-SCH transport block received within a TTI is 1000;

the $N_{soft}$ is 25344; and the maximum number of supported layers for spatial multiplexing in downlink is 1.

In the embodiment of the present invention, the process of performing bit selection according to the $N_{cb}$ after the $N_{cb}$ is determined is as follows.

for an $r^{th}$ code block in the downlink data, first determining an output sequence length E after rate matching of the $r^{th}$ code block is completed, and performing bit selection and reduction according to an $N_{cb}$ of the $r^{th}$ code block and the output sequence length E after rate matching of the $r^{th}$ code block is completed.

The following manner may be used to determine the output sequence length E after rate matching of the $r^{th}$ code block is completed:

$\gamma = G' \mod C$ (formula 3) is set, where the C is the number of code blocks that a transport block is divided into, and $G' = G/(N_L \cdot Q_m)$ (formula 4), where: the G is the total number of bits available when a transport block is transmitted; the $Q_m$ is a parameter related to a modulation method, the $Q_m$ for a QPSK modulation method is 2, the $Q_m$ for a 16QAM modulation method is 4, and the $Q_m$ for a 64QAM modulation method is 6; the $N_L$ is a parameter related to a data transmission mode, the $N_L$ is 2 when a transmit diversity transmission mode is used, and for other data transmission modes, the $N_L$ is equal to the number of layers to which the transmission is mapped;

if $r \leq C - \gamma - 1$, the output sequence length after rate matching of the $r^{th}$ code block is completed is $E = N_L \cdot Q_m \cdot \lfloor G'/C \rfloor$ (formula 5);

otherwise, the output sequence length after rate matching of the $r^{th}$ code block is completed is $E = N_L \cdot Q_m \cdot \lceil G'/C \rceil$ (formula 6).

Then, $$k_0 = R_{subblock}^{TC} \cdot \left(2 \cdot \left\lceil \frac{N_{cb}}{8 R_{subblock}^{TC}} \right\rceil \cdot rv_{idx} + 2 \right) \quad \text{(formula 7)}$$

is set, where the $R_{subblock}^{TC}$ is the number of matrix rows determined in sub-block interleaving and satisfies the relation $D \leq (R_{subblock}^{TC} \times C_{subblock}^{TC})$ (formula 8), the D is a length of a bit sequence input in a sub-block interleaver, and the $C_{subblock}^{TC}$ is 32.

Finally, a bit sequence $w_k$ in a virtual circular buffer is determined. Circular selection is started from a start point $w_{k0}$ to an end point $w_{N_{cb}}$ sequentially. Null bits are removed. A sequence with the length E is selected as an output of bit selection and reduction. Sequences are concatenated in series after rate matching of each code block is completed, and a sequence after the serial concatenation is used as an output sequence of code block concatenation. The output sequence is mapped to the PDSCH for transmission.

After the $N_{cb}$ is determined, bit selection is performed according to the $N_{cb}$, and then the data is transmitted according to the selected bits. This is a process well known to persons skilled in the art and is not further described in detail herein.

Embodiment 2

Figure 2:
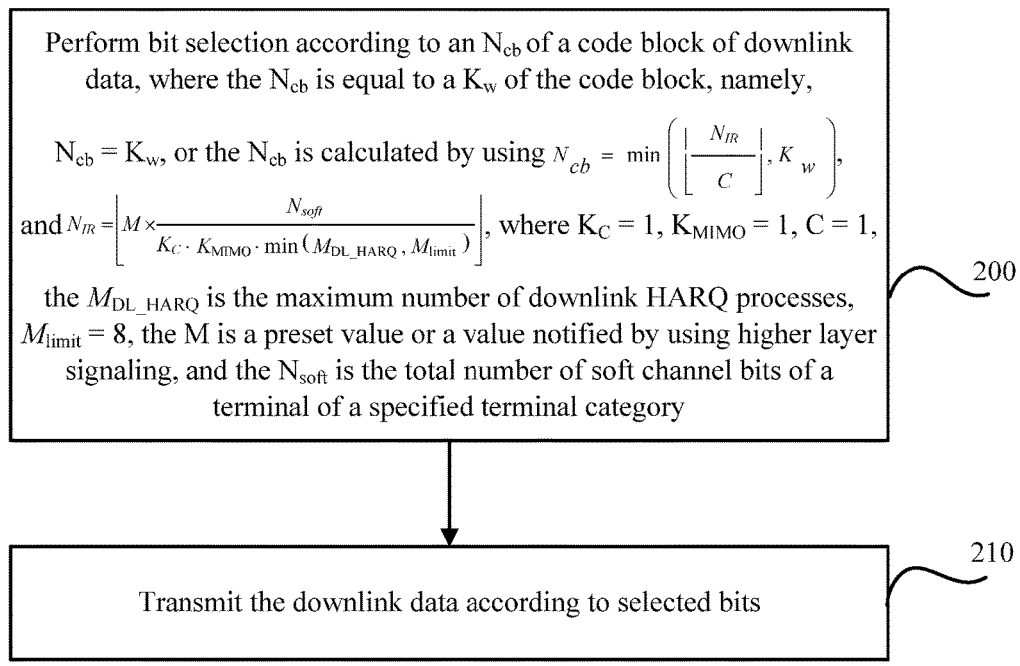
FIG. 2 is a second flowchart of transmitting downlink data according to an embodiment of the present invention.

As shown in FIG. 2, in the embodiment of the present invention, a second detailed process of transmitting downlink data is as follows.

Step 200: Perform bit selection according to an $N_{cb}$ of a code block of downlink data, where the $N_{cb}$ is equal to a $K_w$ of the code block, namely, $N_{cb} = K_w$, or the $N_{cb}$ is calculated by using $$N_{cb} = \min\left(\left\lfloor \frac{N_{IR}}{C} \right\rfloor, K_w \right),$$

where $$N_{IR} = \left\lfloor M \times \frac{N_{soft}}{K_C \cdot K_{MIMO} \cdot \min(M_{DL\_HARQ}, M_{limit})} \right\rfloor,$$

$$K_C = 1,$$

-continued
$$K_{MIMO} = 1,$$
$$C = 1,$$

the $M_{DL\_HARQ}$ is the maximum number of downlink HARQ processes, $M_{limit} = 8$, the M is a preset value or a value notified by using higher layer signaling, and the $N_{soft}$ is the total number of soft channel bits of a terminal of a specified terminal category.

Step 210: Transmit the downlink data according to selected bits.

In the embodiment of the present invention, optionally, the downlink data is data that is delivered over a PCH to a physical layer; and/or
the downlink data is data that is delivered over a DL-SCH to the physical layer.

A category of a terminal for receiving the downlink data includes the specified terminal category and a terminal category 1 to a terminal category 10.

In the embodiment of the present invention, if the downlink data is unicast data, and a category of a terminal for receiving the unicast data is the specified terminal category, and when $K_{MIMO} = 1$, there are multiple manners of transmitting the downlink data according to the selected bits. Optionally, the following manner may be used:

transmitting the unicast data to the terminal of the specified terminal category according to the selected bits.

When the specified terminal category is configured to receive a PDSCH that is based on a transmission mode 1 to a transmission mode 10, $K_{MIMO} = 1$.

In the embodiment of the present invention, optionally, the unicast data is data that is delivered over a DL-SCH neither associated with an RA-RNTI nor associated with a system information SI-RNTI to the physical layer.

In the embodiment of the present invention, optionally, for the DL-SCH not associated with the RA-RNTI, a PDSCH to which the DL-SCH is mapped is indicated by a PDCCH including a CRC that is not scrambled by the RA-RNTI; and for the DL-SCH not associated with the SI-RNTI, a PDSCH to which the DL-SCH is mapped is indicated by a PDCCH including a CRC that is not scrambled by the SI-RNTI.

In the embodiment of the present invention, optionally, the terminal of the specified terminal category has multiple forms, and optionally, is a terminal that has a specified uplink capability and/or a specified downlink capability.

In the embodiment of the present invention, optionally, the specified uplink capability includes one or any combination of the following:

the maximum number of UL-SCH transport block bits transmitted within a TTI is 1000;
the maximum number of bits of an UL-SCH transport block transmitted within a TI is 1000; and
support for 64 QAM in uplink is no; and
the specified downlink capability includes one or any combination of the following:
the maximum number of DL-SCH transport block bits received within a TTI is 1000;
the maximum number of bits of a DL-SCH transport block received within a TTI is 1000;
the $N_{soft}$ is 25344; and
the maximum number of supported layers for spatial multiplexing in downlink is 1.

In the embodiment of the present invention, after the $N_{cb}$ is determined, bit selection is performed according to the $N_{cb}$, and then the data is transmitted according to the selected bits. This is a process well known to persons skilled in the art and is not further described in detail herein.

Embodiment 3

Figure 3:
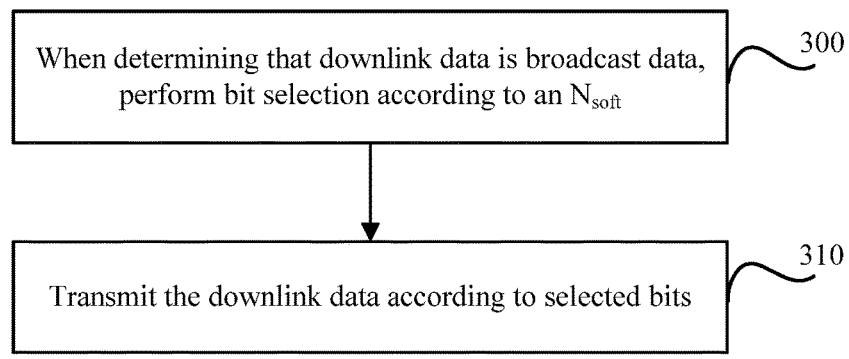
FIG. 3 is a third flowchart of transmitting downlink data according to an embodiment of the present invention.

As shown in FIG. 3, in the embodiment of the present invention, a third detailed procedure for transmitting downlink data is as follows.

Step 300: When determining that downlink data is broadcast data, perform bit selection according to an $N_{soft}$.

Step 310: Transmit the downlink data according to selected bits.

In the embodiment of the present invention, there are multiple manners of determining that the downlink data is the broadcast data. Optionally, the following several manners may be used:

if the downlink data is data that is delivered over a PCH to a physical layer, determining that the downlink data is the broadcast data; and/or if the downlink data is data that is delivered over a DL-SCH associated with an RA-RNTI to the physical layer, determining that the downlink data is the broadcast data; and/or if the downlink data is data that is delivered over a DL-SCH associated with an SI-RNTI to the physical layer, determining that the downlink data is the broadcast data.

In the embodiment of the present invention, the $N_{soft}$ has multiple forms. Optionally, the $N_{soft}$ is a first $N_{soft}$, where the first $N_{soft}$ is an $N_{soft}$ of a terminal of a first terminal category, and the first terminal category is any one of a terminal category 1 to a terminal category 5.

In this case, when bit selection is performed according to the total number $N_{soft}$ of soft channel bits, the following manner may be used:

performing bit selection according to the first $N_{soft}$.

In the embodiment of the present invention, optionally, the first terminal category is acquired according to first indication information reported by a terminal of a specified terminal category, where the first indication information is ue-Category information; or the first terminal category is determined according to a preset rule. For example, a technical specification definitely specifies that the first terminal category is the terminal category 1.

A category of a terminal for receiving the downlink data includes the specified terminal category and the terminal category 1 to a terminal category 10.

In the embodiment of the present invention, the method further includes:

when determining that the downlink data is unicast data and that a category of a terminal for receiving the unicast data is a second terminal category, performing bit selection according to a second $N_{soft}$, where the second $N_{soft}$ is an $N_{soft}$ of the terminal of the second terminal category, and the second terminal category is the specified terminal category; and transmitting the unicast data to the terminal of the specified terminal category according to selected bits.

In the embodiment of the present invention, optionally, the specified terminal category is acquired according to second indication information reported by the terminal of the specified terminal category, where the second indication information is ue-Category-v12xx information, and the v12xx is a version number of a technical specification including the indication information.

In the embodiment of the present invention, optionally, the $N_{soft}$ is a second $N_{soft}$, where the second $N_{soft}$ is an $N_{soft}$ of a terminal of a second terminal category, and the second terminal category is a specified terminal category; and in this case, when bit selection is performed according to the total number $N_{soft}$ of soft channel bits, optionally, the following manner may be used:

performing bit selection according to the second $N_{soft}$ and the maximum number $M_{DL-HARQ}$ of downlink HARQ processes, where the $M_{DL-HARQ}$ is a preset value of 1 or 2 or 3.

In the embodiment of the present invention, optionally, the specified terminal category is acquired according to second indication information reported by the terminal of the specified terminal category, where the second indication information is ue-Category-v12xx information, and the v12xx is a version number of a technical specification including the indication information.

The category of the terminal for receiving the downlink data includes the specified terminal category and the terminal category 1 to the terminal category 10.

In the embodiment of the present invention, further, the method further includes:

when determining that the downlink data is unicast data and that a category of a terminal for receiving the unicast data is the second terminal category, performing bit selection according to the second $N_{soft}$; and transmitting the unicast data to the terminal of the second terminal category according to the selected bits.

In the embodiment of the present invention, there are multiple manners of determining that the downlink data is the unicast data. Optionally, the following manner may be used:

if the downlink data is data that is delivered over a DL-SCH neither associated with an RA-RNTI nor associated with an SI-RNTI to the physical layer, determining that the downlink data is the unicast data.

In the embodiment of the present invention, optionally, for the DL-SCH associated with the RA-RNTI, a PDSCH to which the DL-SCH is mapped is indicated by a PDCCH including a CRC scrambled by the RA-RNTI;

for the DL-SCH associated with the SI-RNTI, a PDSCH to which the DL-SCH is mapped is indicated by a PDCCH including a CRC scrambled by the SI-RNTI;

for the DL-SCH not associated with the RA-RNTI, a PDSCH to which the DL-SCH is mapped is indicated by a PDCCH including a CRC that is not scrambled by the RA-RNTI; and for the DL-SCH not associated with the SI-RNTI, a PDSCH to which the DL-SCH is mapped is indicated by a PDCCH including a CRC that is not scrambled by the SI-RNTI.

In the embodiment of the present invention, optionally, the terminal of the specified terminal category is a terminal that has a specified uplink capability and/or a specified downlink capability.

In the embodiment of the present invention, optionally, the specified uplink capability includes one or any combination of the following:

the maximum number of UL-SCH transport block bits transmitted within a TI is 1000;

the maximum number of bits of an UL-SCH transport block transmitted within a TI is 1000; and support for 64QAM in uplink is no; and the specified downlink capability includes one or any combination of the following:

the maximum number of DL-SCH transport block bits received within a TI is 1000;

the maximum number of bits of a DL-SCH transport block received within a TI is 1000;

the $N_{soft}$ is 25344; and the maximum number of supported layers for spatial multiplexing in downlink is 1.

The process of determining the $N_{cb}$ according to the $N_{soft}$ is shown by the formula 1 and formula 2. After the $N_{cb}$ is determined, bit selection is performed according to the $N_{cb}$, and then the data is transmitted according to the selected bits. This is a process well known to persons skilled in the art and is not further described in detail herein.

As may be seen from the foregoing three embodiments, if the technical solutions described in Embodiments 1, 2, and 3 are used to transmit downlink data, each time when a base station transmits downlink data, bits are selected in such a way that a length and a start point of a sequence that a terminal of any terminal category expects to receive in initial transmission (or retransmission) of a code block are the same as a length and a start point of a sequence that a transmit end determines to transmit in initial transmission (or retransmission) of the same code block, so that the terminal of any terminal category can perform reliable decoding; if decoding fails, a start point of a sequence stored by the terminal of any terminal category each time in initial transmission (or retransmission) of a code block is the same as a start point of a sequence that the transmit end determines to transmit in initial transmission (or retransmission) of the same code block. Therefore, a disadvantage is avoided that decoding cannot be performed correctly because information bits that the terminal expects the base station to transmit are not information bits actually transmitted by the base station in the case of inconsistent assumptions of the terminal and the base station, and decoding accuracy of the terminal is improved.

Embodiment 4

Figure 4:
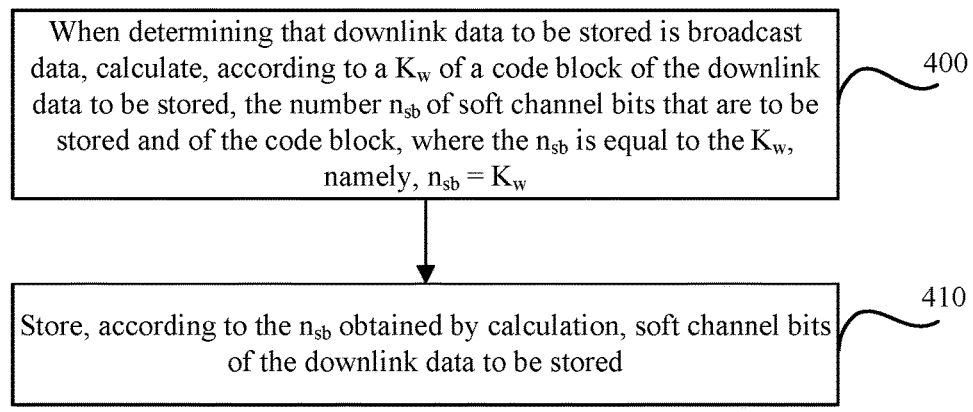
FIG. 4 is a first flowchart of storing downlink data according to an embodiment of the present invention.

As shown in FIG. 4, in the embodiment of the present invention, a first detailed process of storing downlink data is as follows.

Step 400: When determining that downlink data to be stored is broadcast data, calculate, according to a $K_w$ of a code block of the downlink data to be stored, the number $n_{sb}$ of soft channel bits that are to be stored and of the code block, where the $n_{sb}$ is equal to the $K_w$, namely, $n_{sb}=K_w$.

Step 410: Store, according to the $n_{sb}$ obtained by calculation, soft channel bits of the downlink data to be stored.

Because the downlink data to be stored needs to be received first, in the embodiment of the present invention, before the calculating, according to a $K_w$ of a code block of the downlink data to be stored, an $n_{sb}$ that is to be stored and of the code block, the method further includes the following operation:

performing rate de-matching on received downlink data according to a soft $N_{cb}$ of a code block of the received downlink data, where the received downlink data includes the downlink data to be stored and downlink data that is not stored, and the $N_{cb}$ is equal to the $K_w$ of the code block, namely, $N_{cb}=K_w$.

In the embodiment of the present invention, there are multiple manners of determining that the downlink data to be stored is the broadcast data. Optionally, the following manner may be used:

if the downlink data to be stored is data that is delivered over a DL-SCH associated with an SI-RNTI to a physical layer, determining that the downlink data to be stored is the broadcast data, where the received downlink data is data delivered over a PCH to the physical layer, and/or is data delivered over a DL-SCH associated with an RA-RNTI to the physical layer, and/or is the data delivered over the DL-SCH associated with the SI-RNTI to the physical layer.

A category of a terminal for receiving or storing the downlink data includes a specified terminal category and a terminal category 1 to a terminal category 10.

In the embodiment of the present invention, the method further includes:

when determining that the downlink data to be stored is unicast data and that a terminal for storing the downlink data to be stored is a terminal of a specified terminal category, calculating the $n_{sb}$ according to an $N_{soft}$ of the terminal of the specified terminal category; and storing, according to the $n_{sb}$ obtained by calculation, the soft channel bits of the downlink data to be stored.

Likewise, because the data to be stored needs to be received first, in the embodiment of the present invention, before the calculating the $n_{sb}$ according to an $N_{soft}$ of the terminal of the specified terminal category, the method further includes the following operation:

performing rate de-matching on the received downlink data according to the $N_{soft}$ of the terminal of the specified terminal category, where the received downlink data includes the downlink data to be stored and the downlink data that is not stored.

In the embodiment of the present invention, optionally, there are multiple manners of determining that the received downlink data is the unicast data. Optionally, the following manner may be used:

if the downlink data to be stored is data that is delivered over a DL-SCH not associated with an SI-RNTI to the physical layer, determining that the downlink data to be stored is the unicast data, where the received downlink data is data delivered over a DL-SCH neither associated with the RA-RNTI nor associated with the SI-RNTI to the physical layer.

In the embodiment of the present invention, optionally, for the DL-SCH associated with the SI-RNTI, a PDSCH to which the DL-SCH is mapped is indicated by a PDCCH including a CRC scrambled by the SI-RNTI;

for the DL-SCH associated with the RA-RNTI, a PDSCH to which the DL-SCH is mapped is indicated by a PDCCH including a CRC scrambled by the RA-RNTI;

for the DL-SCH not associated with the SI-RNTI, a PDSCH to which the DL-SCH is mapped is indicated by a PDCCH including a CRC that is not scrambled by the SI-RNTI; and for the DL-SCH not associated with the RA-RNTI, a PDSCH to which the DL-SCH is mapped is indicated by a PDCCH including a CRC that is not scrambled by the RA-RNTI.

In the embodiment of the present invention, optionally, the terminal of the specified terminal category is a terminal that has a specified uplink capability and/or a specified downlink capability.

In the embodiment of the present invention, optionally, the specified uplink capability includes one or any combination of the following:

the maximum number of UL-SCH transport block bits transmitted within a TTI is 1000;

the maximum number of bits of an UL-SCH transport block transmitted within a TI is 1000; and support for 64QAM in uplink is no; and the specified downlink capability includes one or any combination of the following:

the maximum number of DL-SCH transport block bits received within a TI is 1000;

the maximum number of bits of a DL-SCH transport block received within a TI is 1000;

the $N_{soft}$ is 25344; and the maximum number of supported layers for spatial multiplexing in downlink is 1.

Embodiment 5

As shown in FIG. 5, in the embodiment of the present invention, a second detailed process of storing downlink data is as follows.

Step 500: Calculate, according to an $N_{cb}$ of a code block of downlink data to be stored, an $n_{sb}$ that is to be stored and of the code block, where the $n_{sb}$ is equal to the $N_{cb}$, namely, $n_{sb}=N_{cb}$, or the $n_{sb}$ is equal to the $N_{cb}$ and equal to a $K_w$ of the code block, namely, $n_{sb}=N_{cb}=K_w$, or the Neb is calculated by using $$N_{cb} = \min\left(\left\lfloor \frac{N_{IR}}{C} \right\rfloor, K_w\right),$$

where $$N_{IR} = \left\lfloor M \times \frac{N_{soft}}{K_C \cdot K_{MIMO} \cdot \min(M_{DL\_HARQ}, M_{limit})} \right\rfloor,$$

$$K_C = 1,$$

$$K_{MIMO} = 1,$$

$$C = 1,$$

the $M_{DL\_HARQ}$ is the maximum number of downlink HARQ processes, $M_{limit}=8$, the M is a preset value or a value notified by using higher layer signaling, and the $N_{soft}$ is the total number of soft channel bits of a terminal of a specified terminal category.

Step 510: Store, according to the $n_{sb}$ obtained by calculation, soft channel bits of received downlink data.

Because the downlink data needs to be received first before being stored, in the embodiment of the present invention, before the calculating, according to an $N_{cb}$ of a code block of downlink data to be stored, an $n_{sb}$ that is to be stored and of the code block, the method further includes:

performing rate de-matching on the received downlink data according to the $N_{cb}$, where the received downlink data includes the downlink data to be stored and downlink data that is not stored, and the $N_{cb}$ is equal to the $K_w$ of the code block, namely, $N_{cb}=K_w$, or the $N_{cb}$ is calculated by using $$N_{cb} = \min\left(\left\lfloor \frac{N_{IR}}{C} \right\rfloor, K_w\right),$$

where

-continued $$N_{IR} = \left\lfloor M \times \frac{N_{soft}}{K_C \cdot K_{MIMO} \cdot \min(M_{DL\_HARQ}, M_{limit})} \right\rfloor,$$

$$K_C = 1,$$

$$K_{MIMO} = 1,$$

$$C = 1,$$

the $M_{DL\_HARQ}$ is the maximum number of downlink HARQ processes, $M_{limit}=8$, the M is the preset value or the value notified by using higher layer signaling, and the $N_{soft}$ is the total number of soft channel bits of the terminal of the specified terminal category.

In the embodiment of the present invention, optionally, the downlink data to be stored is data that is delivered over a DL-SCH to a physical layer; and the received downlink data is data that is delivered over a PCH to the physical layer, and/or is the data that is delivered over the DL-SCH to the physical layer.

A category of a terminal for receiving or storing the downlink data includes the specified terminal category and a terminal category 1 to a terminal category 10.

Embodiment 6

As shown in FIG. 6, in the embodiment of the present invention, a third detailed process of storing downlink data is as follows.

Step 600: When determining that downlink data to be stored is broadcast data, calculate, according to an $N_{soft}$, an $n_{sb}$ that is to be stored and of a code block of the downlink data to be stored.

Step 610: Store, according to the $n_{sb}$ obtained by calculation, the soft channel bits of the downlink data to be stored.

In the embodiment of the present invention, before the calculating, according to an $N_{soft}$, an $n_{sb}$ that is to be stored and of a code block of the downlink data to be stored, the method further includes the following operation:

performing rate de-matching on received downlink data according to the $N_{soft}$, where the received downlink data includes the downlink data to be stored and downlink data that is not stored.

In the embodiment of the present invention, optionally, there are multiple manners of determining that the downlink data to be stored is the broadcast data. Optionally, the following manner may be used:

if the downlink data to be stored is data that is delivered over a DL-SCH associated with an SI-RNTI to a physical layer, determining that the downlink data to be stored is the broadcast data, where the received downlink data is data delivered over a PCH to the physical layer, and/or is data delivered over a DL-SCH associated with an RA-RNTI to the physical layer, and/or is the data delivered over the DL-SCH associated with the SI-RNTI to the physical layer.

In the embodiment of the present invention, optionally, the $N_{soft}$ is a first $N_{soft}$, where:

the first $N_{soft}$ is an $N_{soft}$ of a terminal of a first terminal category, and the first terminal category is any one of a terminal category 1 to a terminal category 5;

in this case, the calculating, according to the total number $N_{soft}$ of soft channel bits, the number $n_{sb}$ of soft channel bits that are to be stored and of a code block of the downlink data to be stored, specifically includes:

calculating, according to the first $N_{soft}$, the $n_{sb}$ that is to be stored and of the code block of the downlink data to be stored; and in this case, the performing rate de-matching on received downlink data according to the $N_{soft}$ specifically includes:

performing rate de-matching on the received downlink data according to the first $N_{soft}$.

In the embodiment of the present invention, optionally, the first terminal category is acquired according to first indication information reported by a terminal of a specified terminal category to a base station, where the first indication information is ue-Category information; or the first terminal category is determined according to a preset rule.

A category of a terminal for receiving or storing the downlink data includes the specified terminal category and the terminal category 1 to a terminal category 10.

In the embodiment of the present invention, the method further includes:

when determining that the downlink data to be stored is unicast data and that a terminal for storing the unicast data is the terminal of the specified terminal category, calculating the $n_{sb}$ according to a second $N_{soft}$, where the second $N_{soft}$ is an $N_{soft}$ of the terminal of the specified terminal category; and storing, according to the $n_{sb}$ obtained by calculation, the soft channel bits of the downlink data to be stored.

When determining that the downlink data to be stored is the unicast data, before the calculating the $n_{sb}$ according to a second $N_{soft}$, the method further includes the following operation:

performing rate de-matching on the received downlink data according to the second $N_{soft}$, where the received downlink data includes the downlink data to be stored and the downlink data that is not stored, the second $N_{soft}$ is an $N_{soft}$ of a terminal of a second terminal category, and the second terminal category is the specified terminal category.

In the embodiment of the present invention, optionally, the $N_{soft}$ is a second $N_{soft}$, where the second $N_{soft}$ is an $N_{soft}$ of the terminal of the specified terminal category;

in this case, the calculating, according to the total number $N_{soft}$ of soft channel bits, the number $n_{sb}$ of soft channel bits that are to be stored and of a code block to be stored, specifically includes:

calculating, according to the second $N_{soft}$ and the maximum number $M_{DL-HARQ}$ of downlink HARQ processes, the $n_{sb}$ that is to be stored and of the code block to be stored, where the $M_{DL-HARQ}$ is a preset value of 1 or 2 or 3; and in this case, the performing rate de-matching on received downlink data according to the $N_{soft}$ specifically includes:

performing rate de-matching on the received downlink data according to the second $N_{soft}$ and the maximum number $M_{DL-HARQ}$ of downlink HARQ processes, where $M_{DL-HARQ}$ is the preset value of 1 or 2 or 3.

The category of the terminal for receiving or storing the downlink data includes the specified terminal category and the terminal category 1 to the terminal category 10.

In the embodiment of the present invention, the method further includes:

when determining that the downlink data to be stored is unicast data and that a terminal for storing the unicast data is the terminal of the specified terminal category, calculating the $n_{sb}$ according to the second $N_{soft}$, where the second $N_{soft}$ is the $N_{soft}$ of the terminal of the specified terminal category; and storing, according to the $n_{sb}$ obtained by calculation, the soft channel bits of the downlink data to be stored.

In this case, before the calculating the $n_{sb}$ according to the second $N_{soft}$, the method further includes the following operation:

performing rate de-matching on the received downlink data according to the second $N_{soft}$, where the received downlink data includes the downlink data to be stored and the downlink data that is not stored, and the second $N_{soft}$ is the $N_{soft}$ of the terminal of the specified terminal category.

In the embodiment of the present invention, optionally, there are multiple manners of determining that the downlink data to be stored is the unicast data. Optionally, the following manner may be used:

if the downlink data to be stored is data that is delivered over a DL-SCH not associated with an SI-RNTI to the physical layer, determining that the downlink data to be stored is the unicast data.

In the embodiment of the present invention, optionally, the received downlink data is the data delivered over the PCH to the physical layer, and/or is the data delivered over the DL-SCH associated with the RA-RNTI to the physical layer, and/or is the data delivered over the DL-SCH associated with the SI-RNTI to the physical layer.

In the embodiment of the present invention, optionally, for the DL-SCH associated with the SI-RNTI, a PDSCH to which the DL-SCH is mapped is indicated by a PDCCH including a CRC scrambled by the SI-RNTI;

for the DL-SCH associated with the RA-RNTI, a PDSCH to which the DL-SCH is mapped is indicated by a PDCCH including a CRC scrambled by the RA-RNTI;

for the DL-SCH not associated with the SI-RNTI, a PDSCH to which the DL-SCH is mapped is indicated by a PDCCH including a CRC that is not scrambled by the SI-RNTI; and for the DL-SCH not associated with the RA-RNTI, a PDSCH to which the DL-SCH is mapped is indicated by a PDCCH including a CRC that is not scrambled by the RA-RNTI.

In the embodiment of the present invention, optionally, the terminal of the specified terminal category is a terminal that has a specified uplink capability and/or a specified downlink capability.

In the embodiment of the present invention, optionally, the specified uplink capability includes one or any combination of the following:

the maximum number of UL-SCH transport block bits transmitted within a TTI is 1000;

the maximum number of bits of an UL-SCH transport block transmitted within a TTI is 1000; and support for 64QAM in uplink is no; and the specified downlink capability includes one or any combination of the following:

the maximum number of DL-SCH transport block bits received within a TTI is 1000;

the maximum number of bits of a DL-SCH transport block received within a TTI is 1000;

the $N_{soft}$ is 25344; and the maximum number of supported layers for spatial multiplexing in downlink is 1.

As may be seen from the foregoing three embodiments, if the technical solutions described in Embodiments 4, 5, and 6 are used to store downlink data, a length and a start point of a sequence that a terminal of any terminal category expects to receive in initial transmission (or retransmission) of a code block are the same as a length and a start point of a sequence that a transmit end determines to transmit in initial transmission (or retransmission) of the same code block, so that the terminal of any terminal category can perform reliable decoding; if decoding fails, a start point of a sequence that the terminal of any terminal category stores each time in initial transmission (or retransmission) of a code block is the same as a start point of a sequence that the transmit end determines to transmit in initial transmission (or retransmission) of the same code block. Therefore, a disadvantage is avoided that decoding cannot be performed correctly because information bits that the terminal expects a base station to transmit are not information bits actually transmitted by the base station in the case of inconsistent assumptions of the terminal and the base station, and decoding accuracy of the terminal is improved.

Figure 7:
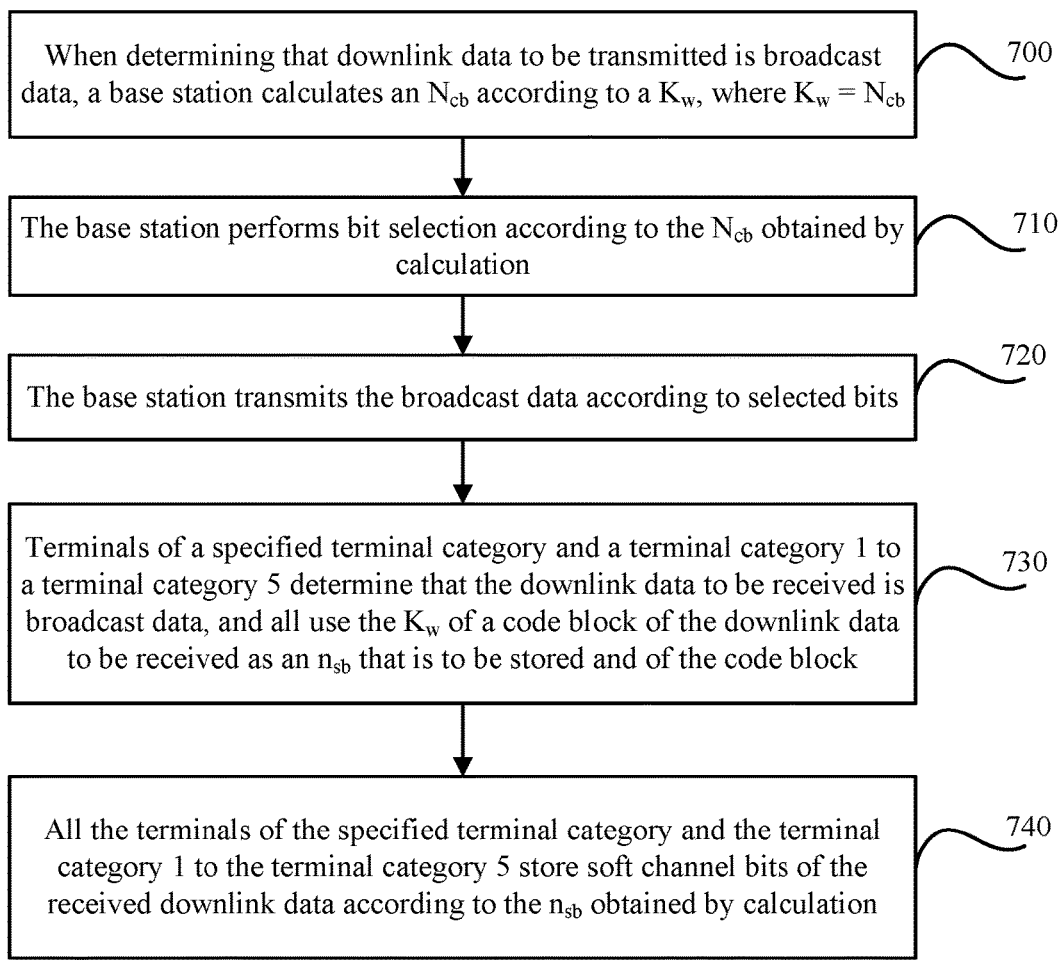
FIG. 7 is a flowchart of transmitting downlink data according to an embodiment of the present invention.

For a better understanding of the embodiments of the present invention, the following provides a specific application scenario to further describe a process of transmitting downlink data in detail, as shown in FIG. 7.

Terminals to which a base station transmits broadcast data include a terminal of a specified terminal category mentioned in the embodiments of the present invention, and also include terminals of a terminal category 1 to a terminal category 5 in the prior art.

Step 700: When determining that downlink data to be transmitted is broadcast data, a base station calculates an $N_{cb}$ according to a $K_w$, where $K_w = N_{cb}$.

Step 710: The base station performs bit selection according to the $N_{cb}$ obtained by calculation.

Step 720: The base station transmits the broadcast data according to selected bits.

Step 730: Terminals of a specified terminal category and a terminal category 1 to a terminal category 5 determine that the downlink data to be received is broadcast data, and all use the $K_w$ of a code block of the downlink data to be received as an $n_{sb}$ that is to be stored and of the code block.

Step 740: All the terminals of the specified terminal category and the terminal category 1 to the terminal category 5 store soft channel bits of the received downlink data according to the $n_{sb}$ obtained by calculation.

Figure 8A:
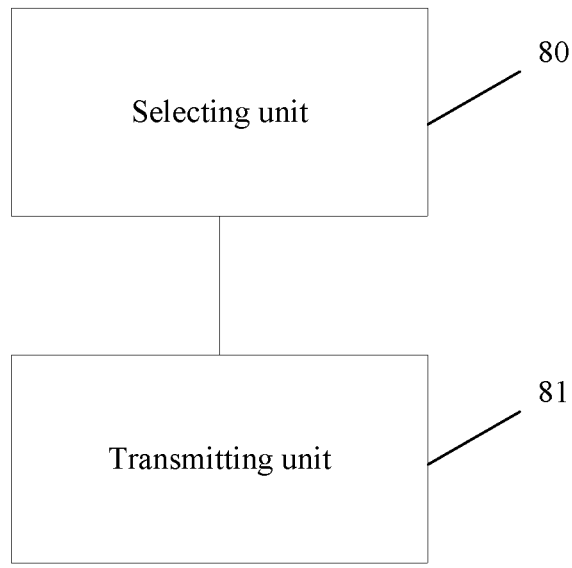
FIG. 8A is a schematic diagram of a first functional structure of a base station according to an embodiment of the present invention.

Based on the foregoing technical solutions, as shown in FIG. 8A, in an embodiment of the present invention, a base station includes a selecting unit 80 and a transmitting unit 81, where:

the selecting unit 80 is configured to: when determining that downlink data is broadcast data, perform bit selection according to a soft buffer size $N_{cb}$ of a code block of the broadcast data, where the $N_{cb}$ is equal to a circular buffer size $K_w$ of the code block, namely, $N_{cb} = K_w$; and the transmitting unit 81 is configured to transmit the broadcast data according to selected bits.

In the embodiment of the present invention, optionally, the selecting unit 80 is specifically configured to:

if the downlink data is data that is delivered over a paging channel PCH to a physical layer, determine that the downlink data is the broadcast data; and/or if the downlink data is data that is delivered over a downlink shared channel DL-SCH associated with a random access RA-radio network temporary identifier RNTI to the physical layer, determine that the downlink data is the broadcast data; and/or if the downlink data is data that is delivered over a DL-SCH associated with a system information SI-RNTI to the physical layer, determine that the downlink data is the broadcast data.

In the embodiment of the present invention, further, the selecting unit 80 is further configured to:

when determining that the downlink data is unicast data and that a category of a terminal for receiving the unicast data is a specified terminal category, perform bit selection according to the total number $N_{soft}$ of soft channel bits of the terminal of the specified terminal category; and the transmitting unit 81 is further configured to transmit the unicast data to the terminal of the specified terminal category according to selected bits.

In the embodiment of the present invention, optionally, the selecting unit 80 is specifically configured to:

if the downlink data is data that is delivered over a DL-SCH neither associated with an RA-RNTI nor associated with an SI-RNTI to a physical layer, determine that the downlink data is the unicast data.

In the embodiment of the present invention, optionally, for the DL-SCH associated with the RA-RNTI, over which the downlink data determined by the selecting unit 80 is delivered to the physical layer, a physical downlink shared channel PDSCH to which the DL-SCH is mapped is indicated by a physical downlink control channel PDCCH including a cyclic redundancy check CRC scrambled by the RA-RNTI;

for the DL-SCH associated with the SI-RNTI, over which the downlink data determined by the selecting unit 80 is delivered to the physical layer, a PDSCH to which the DL-SCH is mapped is indicated by a PDCCH including a CRC scrambled by the SI-RNTI;

for the DL-SCH not associated with the RA-RNTI, over which the downlink data determined by the selecting unit 80 is delivered to the physical layer, a PDSCH to which the DL-SCH is mapped is indicated by a PDCCH including a CRC that is not scrambled by the RA-RNTI; and for the DL-SCH not associated with the SI-RNTI, over which the downlink data determined by the selecting unit 80 is delivered to the physical layer, a PDSCH to which the DL-SCH is mapped is indicated by a PDCCH including a CRC that is not scrambled by the SI-RNTI.

In the embodiment of the present invention, optionally, the specified terminal category of the terminal for receiving the downlink data transmitted by the transmitting unit 81 is acquired according to indication information reported by the terminal, where the indication information is ue-Category-v12xx information, and the v12xx is a version number of a technical specification including the indication information.

In the embodiment of the present invention, optionally, the terminal of the specified terminal category that receives the downlink data transmitted by the transmitting unit 81 is a terminal that has a specified uplink capability and/or a specified downlink capability.

In the embodiment of the present invention, optionally, the specified uplink capability of the terminal of the specified terminal category that receives the downlink data transmitted by the transmitting unit 81 includes one or any combination of the following:

the maximum number of uplink shared channel UL-SCH transport block bits transmitted within a transmission time interval TTI is 1000;

the maximum number of bits of an UL-SCH transport block transmitted within a TI is 1000; and support for 64 quadrature amplitude modulation QAM in uplink is no; and the specified downlink capability of the terminal of the specified terminal category that receives the downlink data transmitted by the transmitting unit 81 includes one or any combination of the following:

the maximum number of downlink shared channel DL-SCH transport block bits received within a TTI is 1000;

the maximum number of bits of a DL-SCH transport block received within a TTI is 1000;

the $N_{soft}$ is 25344; and the maximum number of supported layers for spatial multiplexing in downlink is 1.

Figure 8B:
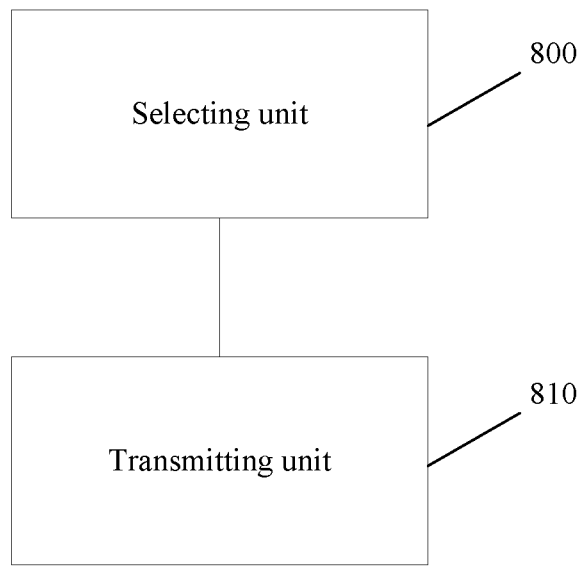
FIG. 8B is a schematic diagram of a second functional structure of a base station according to an embodiment of the present invention.

Based on the foregoing technical solutions, as shown in FIG. 8B, in an embodiment of the present invention, a base station includes a selecting unit 800 and a transmitting unit 810, where:

the selecting unit 800 is configured to perform bit selection according to a soft buffer size $N_{cb}$ of a code block of downlink data, where the $N_{cb}$ is equal to a circular buffer size $K_w$ of the code block, namely, $N_{cb}=K_w$, or the $N_{cb}$ is calculated by using $$N_{cb} = \min\left(\left\lfloor \frac{N_{IR}}{C} \right\rfloor, K_w\right),$$

where $$N_{IR} = \left\lfloor M \times \frac{N_{soft}}{K_C \cdot K_{MIMO} \cdot \min(M_{DL\_HARQ}, M_{limit})} \right\rfloor,$$

$$K_C = 1,$$

$$K_{MIMO} = 1,$$

$$C = 1,$$

the $M_{DL\_HARQ}$ is the maximum number of downlink hybrid automatic repeat request HARQ processes, $M_{limit}=8$, the M is a preset value or a value notified by using higher layer signaling, and the $N_{soft}$ is the total number of soft channel bits of a terminal of a specified terminal category; and the transmitting unit 810 is configured to transmit the downlink data according to selected bits.

In the embodiment of the present invention, optionally, the downlink data corresponding to the $N_{cb}$ used when the selecting unit 800 performs bit selection is data that is delivered over a paging channel PCH to a physical layer, and/or is data that is delivered over a downlink shared channel DL-SCH to the physical layer.

In the embodiment of the present invention, optionally, the transmitting unit 810 is further configured to: if the downlink data is unicast data, and a category of a terminal for receiving the unicast data is the specified terminal category, and when $K_{MIMO}=1$, transmit the unicast data to the terminal of the specified terminal category according to the selected bits.

In the embodiment of the present invention, optionally, the unicast data sent by the transmitting unit 810 is data that is delivered over a downlink shared channel DL-SCH neither associated with a random access RA-radio network temporary identifier RNTI nor associated with a system information SI-RNTI to the physical layer.

In the embodiment of the present invention, optionally, for the DL-SCH not associated with the RA-RNTI, over which the unicast data transmitted by the transmitting unit 810 is delivered to the physical layer, a physical downlink shared channel PDSCH to which the DL-SCH is mapped is indicated by a physical downlink control channel PDCCH including a cyclic redundancy check CRC that is not scrambled by the RA-RNTI; and for the DL-SCH not associated with the SI-RNTI, over which the unicast data transmitted by the transmitting unit 810 is delivered to the physical layer, a PDSCH to which the DL-SCH is mapped is indicated by a PDCCH including a CRC that is not scrambled by the SI-RNTI.

In the embodiment of the present invention, optionally, the terminal of the specified terminal category corresponding to the $N_{soft}$ used by the selecting unit 800 is a terminal that has a specified uplink capability and/or a specified downlink capability.

In the embodiment of the present invention, optionally, the specified uplink capability of the terminal of the specified terminal category corresponding to the $N_{soft}$ used by the selecting unit 800 includes one or any combination of the following:

the maximum number of uplink shared channel UL-SCH transport block bits transmitted within a transmission time interval TTI is 1000;

the maximum number of bits of an UL-SCH transport block transmitted within a TTI is 1000; and support for 64 quadrature amplitude modulation QAM in uplink is no; and the specified downlink capability of the terminal of the specified terminal category corresponding to the $N_{soft}$ used by the selecting unit 800 includes one or any combination of the following:

the maximum number of downlink shared channel DL-SCH transport block bits received within a TTI is 1000;

the maximum number of bits of a DL-SCH transport block received within a TTI is 1000;

the total number $N_{soft}$ of soft channel bits is 25344; and the maximum number of supported layers for spatial multiplexing in downlink is 1.

Figure 8C:
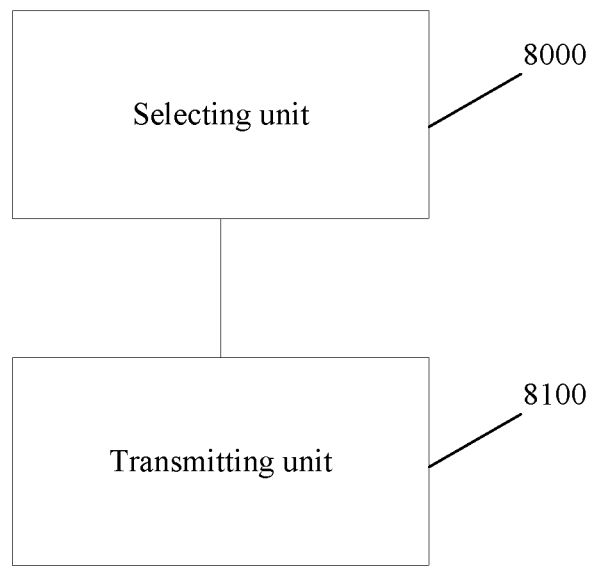
FIG. 8C is a schematic diagram of a third functional structure of a base station according to an embodiment of the present invention.

Based on the foregoing technical solutions, as shown in FIG. 8C, in an embodiment of the present invention, a base station includes a selecting unit 8000 and a transmitting unit 8100, where:

the selecting unit 8000 is configured to: when determining that downlink data is broadcast data, perform bit selection according to the total number $N_{soft}$ of soft channel bits; and the transmitting unit 8100 is configured to transmit the broadcast data according to selected bits.

In the embodiment of the present invention, optionally, the selecting unit 8000 is specifically configured to:

if the downlink data is data that is delivered over a paging channel PCH to a physical layer, determine that the downlink data is the broadcast data; and/or if the downlink data is data that is delivered over a downlink shared channel DL-SCH associated with a random access RA-radio network temporary identifier RNTI to the physical layer, determine that the downlink data is the broadcast data; and/or if the downlink data is data that is delivered over a DL-SCH associated with a system information SI-RNTI to the physical layer, determine that the downlink data is the broadcast data.

In the embodiment of the present invention, optionally, the $N_{soft}$ used when the selecting unit 8000 performs bit selection is a first $N_{soft}$, where the first $N_{soft}$ is an $N_{soft}$ of a terminal of a first terminal category, and the first terminal category is any one of a terminal category 1 to a terminal category 5; and the selecting unit 8000 is specifically configured to perform bit selection according to the first $N_{soft}$.

In the embodiment of the present invention, optionally, the first terminal category corresponding to the $N_{soft}$ used when the selecting unit 8000 performs bit selection is acquired according to first indication information reported by a terminal of a specified terminal category, where the first indication information is ue-Category information; or the first terminal category is determined according to a preset rule.

In the embodiment of the present invention, optionally, the selecting unit 8000 is further configured to: when determining that the downlink data is unicast data and that a category of a terminal for receiving the unicast data is a second terminal category, perform bit selection according to a second $N_{soft}$, where the second $N_{soft}$ is an $N_{soft}$ of the terminal of the second terminal category, and the second terminal category is the specified terminal category; and the transmitting unit 8100 is further configured to transmit the unicast data to the terminal of the specified terminal category according to selected bits.

In the embodiment of the present invention, optionally, the specified terminal category of the terminal that is reported in the first indication information and received by the selecting unit 8000 is acquired according to second indication information reported by the terminal of the specified terminal category, where the second indication information is ue-Category-v12xx information, and the v12xx is a version number of a technical specification including the indication information.

In the embodiment of the present invention, optionally, the $N_{soft}$ used when the selecting unit 8000 performs bit selection is a second $N_{soft}$, where the second $N_{soft}$ is an $N_{soft}$ of a terminal of a second terminal category, and the second terminal category is a specified terminal category; and the selecting unit 8000 is specifically configured to perform bit selection according to the second $N_{soft}$ and the maximum number $M_{DL-HARQ}$ of downlink hybrid automatic repeat request HARQ processes, where the $M_{DL-HARQ}$ is a preset value of 1 or 2 or 3.

In the embodiment of the present invention, optionally, the specified terminal category of the terminal that is reported in first indication information and received by the selecting unit 8000 is acquired according to second indication information reported by the terminal of the specified terminal category, where the second indication information is ue-Category-v12xx information, and the v12xx is a version number of a technical specification including the indication information.

In the embodiment of the present invention, optionally, the selecting unit 8000 is further configured to: when determining that the downlink data is unicast data and that a category of a terminal for receiving the unicast data is the second terminal category, perform bit selection according to the second $N_{soft}$; and the transmitting unit 8100 is further configured to transmit the unicast data to the terminal of the second terminal category according to the selected bits.

In the embodiment of the present invention, optionally, the selecting unit 8000 is specifically configured to:

if the downlink data is data that is delivered over a DL-SCH neither associated with an RA-RNTI nor associated with an SI-RNTI to the physical layer, determine that the downlink data is the unicast data.

In the embodiment of the present invention, optionally, for the DL-SCH associated with the RA-RNTI, over which the unicast data determined by the selecting unit 8000 is delivered to the physical layer, a physical downlink shared channel PDSCH to which the DL-SCH is mapped is indicated by a physical downlink control channel PDCCH including a cyclic redundancy check CRC scrambled by the RA-RNTI;

for the DL-SCH associated with the SI-RNTI, over which the unicast data determined by the selecting unit 8000 is delivered to the physical layer, a PDSCH to which the DL-SCH is mapped is indicated by a PDCCH including a CRC scrambled by the SI-RNTI;

for the DL-SCH not associated with the RA-RNTI, over which the unicast data determined by the selecting unit 8000 is delivered to the physical layer, a PDSCH to which the DL-SCH is mapped is indicated by a PDCCH including a CRC that is not scrambled by the RA-RNTI; and for the DL-SCH not associated with the SI-RNTI, over which the unicast data determined by the selecting unit 8000 is delivered to the physical layer, a PDSCH to which the DL-SCH is mapped is indicated by a PDCCH including a CRC that is not scrambled by the SI-RNTI.

In the embodiment of the present invention, optionally, the terminal of the specified terminal category that is reported in the first indication information and received by the selecting unit 8000 is a terminal that has a specified uplink capability and/or a specified downlink capability.

In the embodiment of the present invention, optionally, the specified uplink capability of the terminal reporting the first indication information received by the selecting unit 8000 includes one or any combination of the following:

the maximum number of uplink shared channel UL-SCH transport block bits transmitted within a transmission time interval TI is 1000;

the maximum number of bits of an UL-SCH transport block transmitted within a TTI is 1000; and support for 64 quadrature amplitude modulation QAM in uplink is no; and the specified downlink capability of the terminal reporting the first indication information received by the selecting unit 8000 includes one or any combination of the following:

the maximum number of downlink shared channel DL-SCH transport block bits received within a TTI is 1000;

the maximum number of bits of a DL-SCH transport block received within a TTI is 1000;

the $N_{soft}$ is 25344; and the maximum number of supported layers for spatial multiplexing in downlink is 1.

Figure 9A:
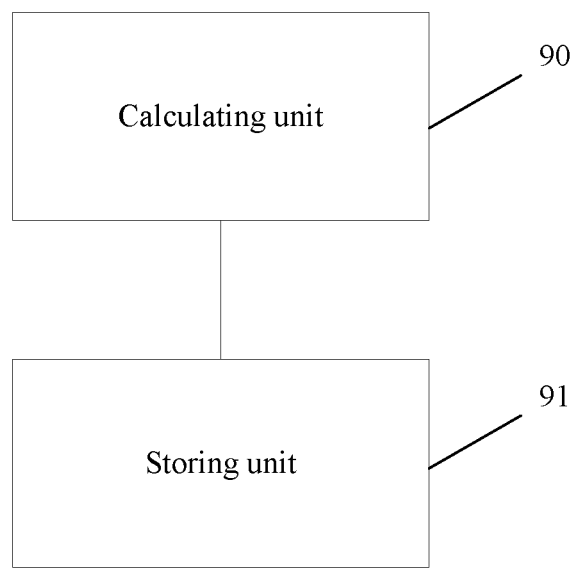
FIG. 9A is a schematic diagram of a first functional structure of a terminal according to an embodiment of the present invention.

Based on the foregoing technical solutions, as shown in FIG. 9A, in an embodiment of the present invention, a terminal includes a calculating unit 90 and a storing unit 91, where:

the calculating unit 90 is configured to: when determining that downlink data to be stored is broadcast data, calculate, according to a circular buffer size $K_w$ of a code block of the downlink data to be stored, the number $n_{sb}$ of soft channel bits that are to be stored and of the code block, where the $n_{sb}$ is equal to the $K_w$, namely, $n_{sb}=K_w$; and the storing unit 91 is configured to store, according to the $n_{sb}$ obtained by calculation, soft channel bits of the downlink data to be stored.

In the embodiment of the present invention, the terminal further includes a receiving unit, where the receiving unit is configured to:

perform rate de-matching on received downlink data according to a soft buffer size $N_{cb}$ of a code block of the received downlink data, where the received downlink data includes the downlink data to be stored and downlink data that is not stored, and the $N_{cb}$ is equal to the circular buffer size $K_w$ of the code block, namely, $N_{cb}=K_w$.

In the embodiment of the present invention, optionally, the calculating unit 90 is specifically configured to:

if the downlink data to be stored is data that is delivered over a downlink shared channel DL-SCH associated with a system information SI-radio network temporary identifier RNTI to a physical layer, determine that the downlink data to be stored is the broadcast data, where the downlink data received by the receiving unit is data delivered over a paging channel PCH to the physical layer, and/or is data delivered over a DL-SCH associated with a random access RA-RNTI to the physical layer, and/or is the data delivered over the DL-SCH associated with the SI-RNTI to the physical layer.

In the embodiment of the present invention, the calculating unit 90 is further configured to:

when determining that the downlink data to be stored is unicast data and that a terminal for storing the downlink data to be stored is a terminal of a specified terminal category, calculate the $n_{sb}$ according to the total number $N_{soft}$ of soft channel bits of the terminal of the specified terminal category; and the storing unit 91 is further configured to store, according to the $n_{sb}$ obtained by calculation, the soft channel bits of the downlink data to be stored.

In the embodiment of the present invention, the receiving unit is further configured to:

perform rate de-matching on the received downlink data according to the $N_{soft}$ of the terminal of the specified terminal category, where the received downlink data includes the downlink data to be stored and the downlink data that is not stored.

In the embodiment of the present invention, optionally, the calculating unit 90 is specifically configured to:

if the downlink data to be stored is data that is delivered over a DL-SCH not associated with an SI-RNTI to the physical layer, determine that the downlink data to be stored is the unicast data, where the downlink data received by the receiving unit is data delivered over a DL-SCH neither associated with the RA-RNTI nor associated with the SI-RNTI to the physical layer.

In the embodiment of the present invention, optionally, for the DL-SCH associated with the SI-RNTI, over which the downlink data determined by the calculating unit 90 is delivered to the physical layer, a physical downlink shared channel PDSCH to which the DL-SCH is mapped is indicated by a physical downlink control channel PDCCH including a cyclic redundancy check CRC scrambled by the SI-RNTI;

for the DL-SCH associated with the RA-RNTI, over which the downlink data determined by the calculating unit 90 is delivered to the physical layer, a PDSCH to which the DL-SCH is mapped is indicated by a PDCCH including a CRC scrambled by the RA-RNTI;

for the DL-SCH not associated with the SI-RNTI, over which the downlink data determined by the calculating unit 90 is delivered to the physical layer, a PDSCH to which the DL-SCH is mapped is indicated by a PDCCH including a CRC that is not scrambled by the SI-RNTI; and for the DL-SCH not associated with the RA-RNTI, over which the downlink data determined by the calculating unit 90 is delivered to the physical layer, a PDSCH to which the DL-SCH is mapped is indicated by a PDCCH including a CRC that is not scrambled by the RA-RNTI.

In the embodiment of the present invention, optionally, the terminal of the specified terminal category corresponding to the $N_{soft}$ used when the calculating unit 90 calculates the $n_{sb}$ is a terminal that has a specified uplink capability and/or a specified downlink capability.

In the embodiment of the present invention, optionally, the specified uplink capability of the terminal of the specified terminal category corresponding to the $N_{soft}$ used when the calculating unit 90 calculates the $n_{sb}$ includes one or any combination of the following:

the maximum number of uplink shared channel UL-SCH transport block bits transmitted within a transmission time interval TTI is 1000;

the maximum number of bits of an UL-SCH transport block transmitted within a TTI is 1000; and support for 64 quadrature amplitude modulation QAM in uplink is no; and the specified downlink capability of the terminal of the specified terminal category corresponding to the $N_{soft}$ used when the calculating unit 90 calculates the $n_{sb}$ includes one or any combination of the following:

the maximum number of downlink shared channel DL-SCH transport block bits received within a TI is 1000;

the maximum number of bits of a DL-SCH transport block received within a TI is 1000;

the $N_{soft}$ is 25344; and the maximum number of supported layers for spatial multiplexing in downlink is 1.

Figure 9B:
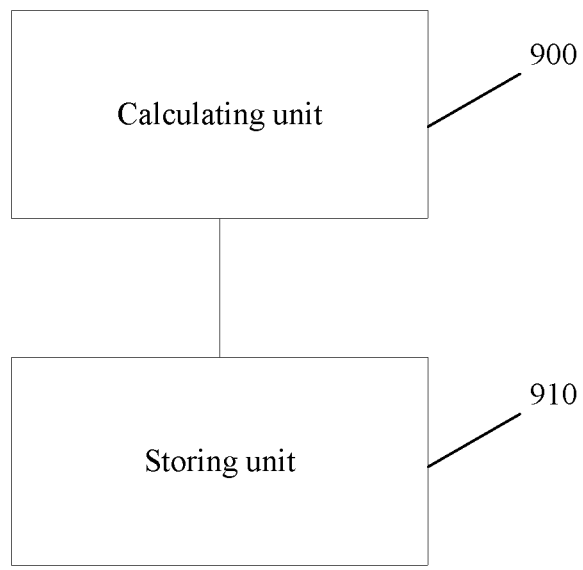
FIG. 9B is a schematic diagram of a second functional structure of a terminal according to an embodiment of the present invention.

Based on the foregoing technical solutions, as shown in FIG. 9B, in an embodiment of the present invention, a terminal includes a calculating unit 900 and a storing unit 910, where:

the calculating unit 900 is configured to calculate, according to a soft buffer size $N_{cb}$ of a code block of downlink data to be stored, the number $n_{sb}$ of soft channel bits that are to be stored and of the code block, where the $n_{sb}$ is equal to the $N_{cb}$, namely, $n_{sb}=N_{cb}$, or the $n_{sb}$ is equal to the $N_{cb}$ and equal to a $K_w$ of the code block, namely, $n_{sb}=N_{cb}=K_w$, or the $N_{cb}$ is calculated by using $$N_{cb} = \min\left(\left\lfloor \frac{N_{IR}}{C} \right\rfloor, K_w\right),$$

where $$N_{IR} = \left\lfloor M \times \frac{N_{soft}}{K_C \cdot K_{MIMO} \cdot \min(M_{DL\_HARQ}, M_{limit})} \right\rfloor,$$

$$K_C = 1,$$

$$K_{MIMO} = 1,$$

$$C = 1,$$

the $M_{DL\_HARQ}$ is the maximum number of downlink HARQ processes, $M_{limit}=8$, the M is a preset value or a value notified by using higher layer signaling, and the $N_{soft}$ is the total number of soft channel bits of a terminal of a specified terminal category; and the storing unit 910 is configured to store, according to the $n_{sb}$ obtained by calculation, soft channel bits of received downlink data.

In the embodiment of the present invention, the terminal further includes a receiving unit, where the receiving unit is configured to:

perform rate de-matching on the received downlink data according to the $N_{cb}$, where the received downlink data includes the downlink data to be stored and downlink data that is not stored, and the $N_{cb}$ is equal to the $K_w$ of the code block, namely, $N_{cb}=K_w$, or the $N_{cb}$ is calculated by using $$N_{cb} = \min\left(\left\lfloor \frac{N_{IR}}{C} \right\rfloor, K_w\right),$$

-continued where $$N_{IR} = \left\lfloor M \times \frac{N_{soft}}{K_C \cdot K_{MIMO} \cdot \min(M_{DL\_HARQ}, M_{limit})} \right\rfloor,$$

$$K_C = 1,$$

$$K_{MIMO} = 1,$$

$$C = 1,$$

the $M_{DL\_HARQ}$ is the maximum number of downlink HARQ processes, $M_{limit}=8$, the M is the preset value or the value notified by using higher layer signaling, and the $N_{soft}$ is the total number of soft channel bits of the terminal of the specified terminal category.

In the embodiment of the present invention, optionally, the downlink data to be stored by the storing unit 910 is data that is delivered over a downlink shared channel DL-SCH to a physical layer; and the downlink data received by the receiving unit is data that is delivered over a paging channel PCH to the physical layer, and/or is the data that is delivered over the downlink shared channel DL-SCH to the physical layer.

Figure 9C:
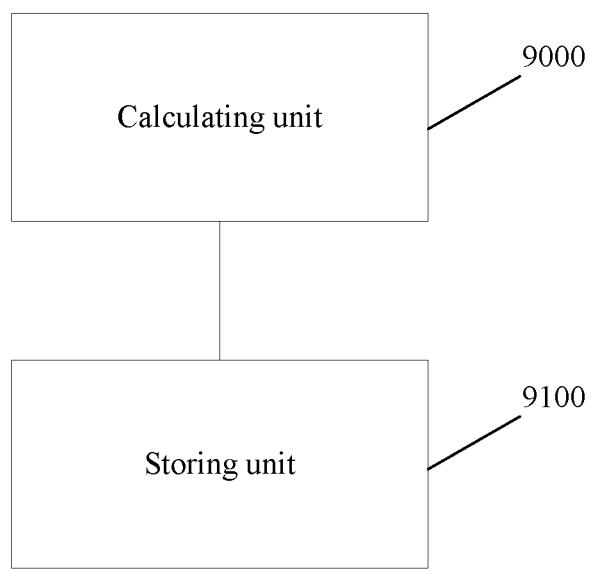
FIG. 9C is a schematic diagram of a third functional structure of a terminal according to an embodiment of the present invention.

Based on the foregoing technical solutions, as shown in FIG. 9C, in an embodiment of the present invention, a terminal includes a calculating unit 9000 and a storing unit 9100, where:

the calculating unit 9000 is configured to: when determining that downlink data to be stored is broadcast data, calculate, according to the total number $N_{soft}$ of soft channel bits, the number $n_{sb}$ of soft channel bits that are to be stored and of a code block of the downlink data to be stored; and the storing unit 9100 is configured to store, according to the $n_{sb}$ obtained by calculation, the soft channel bits of the downlink data to be stored.

Further, in the embodiment of the present invention, the terminal further includes a receiving unit, where the receiving unit is configured to:

perform rate de-matching on received downlink data according to the $N_{soft}$, where the received downlink data includes the downlink data to be stored and downlink data that is not stored.

Optionally, in the embodiment of the present invention, the calculating unit 9000 is specifically configured to:

if the downlink data to be stored is data that is delivered over a downlink shared channel DL-SCH associated with a system information SI-radio network temporary identifier RNTI to a physical layer, determine that the downlink data to be stored is the broadcast data, where the downlink data received by the receiving unit is data delivered over a paging channel PCH to the physical layer, and/or is data delivered over a DL-SCH associated with a random access RA-RNTI to the physical layer, and/or is the data delivered over the DL-SCH associated with the SI-RNTI to the physical layer.

Optionally, in the embodiment of the present invention, the $N_{soft}$ used when the calculating unit 9000 calculates the $n_{sb}$ is a first $N_{soft}$, where:

the first $N_{soft}$ is an $N_{soft}$ of a terminal of a first terminal category, and the first terminal category is any one of a terminal category 1 to a terminal category 5;

the storing unit 9100 is specifically configured to calculate, according to the first $N_{soft}$, the $n_{sb}$ that is to be stored and of the code block of the downlink data to be stored; and the receiving unit is specifically configured to perform rate de-matching on the received downlink data according to the first $N_{soft}$.

Optionally, in the embodiment of the present invention, the first terminal category of the terminal corresponding to the $N_{soft}$ used when the calculating unit 9000 calculates the $n_{sb}$ is acquired according to first indication information reported by a terminal of a specified terminal category to a base station, where the first indication information is ue-Category information; or the first terminal category is determined according to a preset rule.

Further, in the embodiment of the present invention, the calculating unit 9000 is further configured to:

when determining that the downlink data to be stored is unicast data and that a terminal for storing the unicast data is the terminal of the specified terminal category, calculate the $n_{sb}$ according to a second $N_{soft}$, where the second $N_{soft}$ is an $N_{soft}$ of the terminal of the specified terminal category; and the storing unit 9100 is further configured to store, according to the $n_{sb}$ obtained by calculation, the soft channel bits of the downlink data to be stored.

Further, in the embodiment of the present invention, the receiving unit is further configured to:

perform rate de-matching on the received downlink data according to the second $N_{soft}$, where the received downlink data includes the downlink data to be stored and the downlink data that is not stored, the second $N_{soft}$ is an $N_{soft}$ of a terminal of a second terminal category, and the second terminal category is the specified terminal category.

Optionally, in the embodiment of the present invention, the $N_{soft}$ used when the calculating unit 9000 calculates the $n_{sb}$ is a second $N_{soft}$, where the second $N_{soft}$ is an $N_{soft}$ of a terminal of a specified terminal category;

the calculating unit 9000 is specifically configured to calculate, according to the second $N_{soft}$ and the maximum number $M_{DL-HARQ}$ of downlink hybrid automatic repeat request HARQ processes, the $n_{sb}$ that is to be stored and of the code block to be stored, where the $M_{DL-HARQ}$ is a preset value of 1 or 2 or 3; and the receiving unit is specifically configured to perform rate de-matching on the received downlink data according to the second $N_{soft}$ and the maximum number $M_{DL-HARQ}$ of downlink hybrid automatic repeat request HARQ processes, where the $M_{DL-HARQ}$ is the preset value of 1 or 2 or 3.

Further, in the embodiment of the present invention, the calculating unit 9000 is further configured to:

when determining that the downlink data to be stored is unicast data and that a terminal for storing the unicast data is the terminal of the specified terminal category, calculate the $n_{sb}$ according to the second $N_{soft}$, where the second $N_{soft}$ is the $N_{soft}$ of the terminal of the specified terminal category; and the storing unit 9100 is further configured to store, according to the $n_{sb}$ obtained by calculation, the soft channel bits of the downlink data to be stored.

Further, in the embodiment of the present invention, the receiving unit is further configured to:

perform rate de-matching on the received downlink data according to the second $N_{soft}$, where the received downlink data includes the downlink data to be stored and the downlink data that is not stored, and the second $N_{soft}$ is the $N_{soft}$ of the terminal of the specified terminal category.

Optionally, in the embodiment of the present invention, the calculating unit 9000 is specifically configured to:

if the downlink data to be stored is data that is delivered over a DL-SCH not associated with an SI-RNTI to the physical layer, determine that the downlink data to be stored is the unicast data.

Optionally, in the embodiment of the present invention, the downlink data received by the receiving unit is the data delivered over the PCH to the physical layer, and/or is the data delivered over the DL-SCH associated with the RA-RNTI to the physical layer, and/or is the data delivered over the DL-SCH associated with the SI-RNTI to the physical layer.

Optionally, in the embodiment of the present invention, for the DL-SCH associated with the SI-RNTI, over which the downlink data received by the receiving unit is delivered to the physical layer, a physical downlink shared channel PDSCH to which the DL-SCH is mapped is indicated by a physical downlink control channel PDCCH including a cyclic redundancy check CRC scrambled by the SI-RNTI;

for the DL-SCH associated with the RA-RNTI, over which the downlink data received by the receiving unit is delivered to the physical layer, a PDSCH to which the DL-SCH is mapped is indicated by a PDCCH including a CRC scrambled by the RA-RNTI;

for the DL-SCH not associated with the SI-RNTI, over which the downlink data determined by the calculating unit 9000 is delivered to the physical layer, a PDSCH to which the DL-SCH is mapped is indicated by a PDCCH including a CRC that is not scrambled by the SI-RNTI; and for the DL-SCH not associated with the RA-RNTI, over which the downlink data determined by the calculating unit 9000 is delivered to the physical layer, a PDSCH to which the DL-SCH is mapped is indicated by a PDCCH including a CRC that is not scrambled by the RA-RNTI.

Optionally, in the embodiment of the present invention, the terminal of the specified terminal category that is reported in the first indication information and acquired by the calculating unit 9000 is a terminal that has a specified uplink capability and/or a specified downlink capability.

Optionally, in the embodiment of the present invention, the specified uplink capability of the terminal of the specified terminal category that is reported in the first indication information and acquired by the calculating unit 9000 includes one or any combination of the following:

the maximum number of uplink shared channel UL-SCH transport block bits transmitted within a transmission time interval TTI is 1000;

the maximum number of bits of an UL-SCH transport block transmitted within a TTI is 1000; and support for 64 quadrature amplitude modulation QAM in uplink is no; and the specified downlink capability of the terminal of the specified terminal category that is reported in the first indication information and acquired by the calculating unit 9000 includes one or any combination of the following:

the maximum number of downlink shared channel DL-SCH transport block bits received within a TTI is 1000;

the maximum number of bits of a DL-SCH transport block received within a TTI is 1000;

the $N_{soft}$ is 25344; and the maximum number of supported layers for spatial multiplexing in downlink is 1.

In conclusion, in several solutions for transmitting downlink data and storing downlink data provided by the embodiments of the present invention, each time when a base station transmits downlink data, bits are selected in such a way that a length and a start point of a sequence that a terminal of any terminal category expects to receive in initial transmission (or retransmission) of a code block are the same as a length and a start point of a sequence that a transmit end determines to transmit in initial transmission (or retransmission) of the same code block, so that the terminal of any terminal category can perform reliable decoding; if decoding fails, a start point of a sequence stored by the terminal of any terminal category each time in initial transmission (or retransmission) of a code block is the same as a start point of a sequence that the transmit end determines to transmit in initial transmission (or retransmission) of the same code block. Therefore, a disadvantage is avoided that decoding cannot be performed correctly because information bits that the terminal expects the base station to transmit are not information bits actually transmitted by the base station in the case of inconsistent assumptions of the terminal and the base station, and decoding accuracy of the terminal is improved.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a function in one or more processes in the flowcharts and/or in one or more blocks in the block diagrams.

Although some exemplary embodiments of the present invention have been described, persons skilled in the art can make changes and modifications to these embodiments once they learn the basic inventive concept. Therefore, the following claims are intended to be construed as to cover the exemplary embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method for transmitting downlink data, the method comprising:
in response to determining that downlink data is broadcast data, performing bit selection according to a soft buffer size Ncb of a code block of the broadcast data, wherein the Ncb is equal to a circular buffer size Kw of the code block, namely, Ncb=Kw; and
transmitting the broadcast data according to selected bits;
wherein the determining that downlink data is broadcast data comprises:
in response to determining that the downlink data is data that is delivered over a paging channel (PCH) to a physical layer, determining that the downlink data is the broadcast data;
in response to determining that the downlink data is data that is delivered over a downlink shared channel (DL-SCH) associated with a random access radio network temporary identifier (RA-RNTI) to the physical layer, determining that the downlink data is the broadcast data; and
in response to determining that the downlink data is data that is delivered over a DL-SCH associated with a system information SI-RNTI to the physical layer, determining that the downlink data is the broadcast data; and
wherein for the DL-SCH associated with the RA-RNTI, a physical downlink shared channel (PDSCH) to which the DL-SCH is mapped is indicated by a physical downlink control channel (PDCCH) comprising a cyclic redundancy check (CRC) scrambled by the RA-RNTI;
for the DL-SCH associated with the SI-RNTI, a PDSCH to which the DL-SCH is mapped is indicated by a PDCCH comprising a CRC scrambled by the SI-RNTI.

2. The method according to claim 1, wherein
for the DL-SCH not associated with the RA-RNTI, a PDSCH to which the DL-SCH is mapped is indicated by a PDCCH comprising a CRC that is not scrambled by the RA-RNTI; and
for the DL-SCH not associated with the SI-RNTI, a PDSCH to which the DL-SCH is mapped is indicated by a PDCCH comprising a CRC that is not scrambled by the SI-RNTI.

3. The method according to claim 1, wherein the method further comprises:
in response to determining that the downlink data is unicast data and that a category of a terminal for receiving the unicast data is a specified terminal category, performing bit selection according to a total number Nsoft of soft channel bits of the terminal of the specified terminal category; and
transmitting the unicast data to the terminal of the specified terminal category according to selected bits.

4. The method according to claim 3, wherein the determining that the downlink data is unicast data specifically comprises:
in response to determining that the downlink data is data that is delivered over a DL-SCH neither associated with an RA-RNTI nor associated with an SI-RNTI to a physical layer, determining that the downlink data is the unicast data.

5. The method according to claim 3, wherein the specified terminal category is acquired according to indication information reported by the terminal, wherein
the indication information is ue-Category-v12xx information, and the v12xx is a version number of a technical specification comprising the indication information.

6. The method according to claim 3, wherein the terminal of the specified terminal category is a terminal that has a specified uplink capability or a specified downlink capability.

7. The method according to claim 6, wherein the specified uplink capability comprises one or more of the following:
the maximum number of uplink shared channel (UL-SCH) transport block bits transmitted within a transmission time interval (TTI) is 1000;
the maximum number of bits of an UL-SCH transport block transmitted within a TTI is 1000; and
support for 64 quadrature amplitude modulation (QAM) in uplink is no; and
wherein the specified downlink capability comprises one or more of the following:
the maximum number of downlink shared channel (DL-SCH) transport block bits received within a TTI is 1000;
the maximum number of bits of a DL-SCH transport block received within a TTI is 1000;
the Nsoft is 25344; and
the maximum number of supported layers for spatial multiplexing in downlink is 1.

8. A base station comprising:
a processor;
a memory storing a program to be executed in the processor, the program comprising instructions for:
in response to determining that downlink data is broadcast data, performing bit selection according to a soft buffer size Ncb of a code block of the broadcast data, wherein the Ncb is equal to a circular buffer size Kw of the code block, namely, Ncb=Kw; and
a transmitter configured to transmit the broadcast data according to selected bits;
in response to determining that the downlink data is data that is delivered over a paging channel (PCH) to a physical layer, determining that the downlink data is the broadcast data;
in response to determining that the downlink data is data that is delivered over a downlink shared channel DL-SCH associated with a random access radio network temporary identifier (RA-RNTI) to the physical layer, determining that the downlink data is the broadcast data; and
in response to determining that the downlink data is data that is delivered over a DL-SCH associated with a system information SI-RNTI to the physical layer, determining that the downlink data is the broadcast data;
wherein for the DL-SCH associated with the RA-RNTI, over which the downlink data is delivered to the physical layer, a physical downlink shared channel PDSCH to which the DL-SCH is mapped is indicated by a physical downlink control channel (PDCCH) comprising a cyclic redundancy check (CRC) scrambled by the RA-RNTI; and
for the DL-SCH associated with the SI-RNTI, over which the downlink data is delivered to the physical layer, a PDSCH to which the DL-SCH is mapped is indicated by a PDCCH comprising a CRC scrambled by the SI-RNTI.

9. The base station according to claim 8, wherein for the DL-SCH not associated with the RA-RNTI, over which the downlink data is delivered to the physical layer, a PDSCH to which the DL-SCH is mapped is indicated by a PDCCH comprising a CRC that is not scrambled by the RA-RNTI; and for the DL-SCH not associated with the SI-RNTI, over which the downlink data is delivered to the physical layer, a PDSCH to which the DL-SCH is mapped is indicated by a PDCCH comprising a CRC that is not scrambled by the SI-RNTI.

10. The base station according to claim 8, wherein the program comprises further instructions for:

in response to determining that the downlink data is unicast data and that a category of a terminal for receiving the unicast data is a specified terminal category, performing bit selection according to a total number Nsoft of soft channel bits of the terminal of the specified terminal category; and the transmitter is further configured to transmit the unicast data to the terminal of the specified terminal category according to selected bits.

11. The base station according to claim 10, wherein the program comprises further instructions for:

in response to determining that the downlink data is data that is delivered over a DL-SCH neither associated with an RA-RNTI nor associated with an SI-RNTI to a physical layer, determining that the downlink data is the unicast data.

12. The base station according to claim 10, wherein the specified terminal category of the terminal for receiving the downlink data transmitted by the transmitter is acquired according to indication information reported by the terminal, wherein the indication information is ue-Category-v12xx information, and the v12xx is a version number of a technical specification comprising the indication information.

13. The base station according to claim 10, wherein the terminal of the specified terminal category that receives the downlink data transmitted by the transmitter is a terminal that has a specified uplink capability and/or a specified downlink capability.

14. The base station according to claim 13, wherein the specified uplink capability of the terminal of the specified terminal category that receives the downlink data transmitted by the transmitter comprises one or more of the following:

the maximum number of uplink shared channel UL-SCH transport block bits transmitted within a transmission time interval TTI is 1000;

the maximum number of bits of an UL-SCH transport block transmitted within a TTI is 1000; and support for 64 quadrature amplitude modulation (QAM) in uplink is no; and the specified downlink capability of the terminal of the specified terminal category that receives the downlink data transmitted by the transmitter comprises one or more of the following:

the maximum number of downlink shared channel (DL-SCH) transport block bits received within a TTI is 1000;

the maximum number of bits of a DL-SCH transport block received within a TTI is 1000;

the Nsoft is 25344; and the maximum number of supported layers for spatial multiplexing in downlink is 1.

* * * * *